(12) United States Patent
Chung

(10) Patent No.: US 6,415,152 B1
(45) Date of Patent: Jul. 2, 2002

(54) METHOD FOR OPERATING BASE STATION TO SOLVE SPEECH DISABLE STATE BASED ON INTER-SPEECH SPHERE MOVEMENT OF MOBILE STATION IN ENLARGING SPEECH RADIUS LIMITED IN TIMING IN CODE DIVISION MULTIPLE ACCESS MOBILE COMMUNICATION SYSTEM

(75) Inventor: Chae Hun Chung, Ichon (KR)

(73) Assignee: Hyundai Electronics Industries Co., Ltd., Kyoungki-Do (KR)

( * ) Notice: Subject to any disclaimer, the term of this patent is extended or adjusted under 35 U.S.C. 154(b) by 0 days.

(21) Appl. No.: 09/478,626

(22) Filed: Jan. 5, 2000

(30) Foreign Application Priority Data

Jan. 9, 1999 (KR) .............................. 99-326

(51) Int. Cl.[7] ................................ H04Q 7/20
(52) U.S. Cl. ...................... 455/446; 455/422; 455/436; 455/440; 455/450; 370/331; 370/335; 370/342
(58) Field of Search ................ 455/436, 438, 455/440, 442, 444, 450, 422, 449; 370/331, 335, 342

(56) References Cited

U.S. PATENT DOCUMENTS

| | | | |
|---|---|---|---|
| 5,590,177 A | 12/1996 | Vilmur et al. | |
| 5,898,682 A | * 4/1999 | Kanai | 370/331 |
| 6,047,181 A | * 4/2000 | Suonvieri | 455/440 |
| 6,212,405 B1 | * 4/2001 | Jiang et al. | 455/561 |

* cited by examiner

Primary Examiner—Lee Nguyen
Assistant Examiner—Eugene Yun
(74) Attorney, Agent, or Firm—Merchant & Gould PC

(57) ABSTRACT

A method for operating a base station to solve a speech disable state based on the inter-speech sphere movement of a mobile station in enlarging a speech radius limited in timing in a CDMA mobile communication system. In a base station where a speech radius wider than that limited by a modem ASIC is partitioned by a predetermined radius unit into a plurality of speech spheres for the enlargement of the limited speech radius and channel elements are assigned to the partitioned speech spheres for transmission/reception of channels, a handoff operation is performed from an arbitrary channel element in the base station to a channel element assigned to a different speech sphere when a mobile station moves beyond an initial speech sphere during conversation with the arbitrary channel element. At this time, a reverse traffic channel is demodulated and remains at a standby state. Therefore, if the mobile station moves beyond the initial speech sphere above the predetermined radius unit, the demodulated reverse traffic channel is selected and utilized by the channel element assigned to the different speech sphere. This has the effect of preventing a speech disable state based on the inter-speech sphere movement of the mobile station.

18 Claims, 17 Drawing Sheets

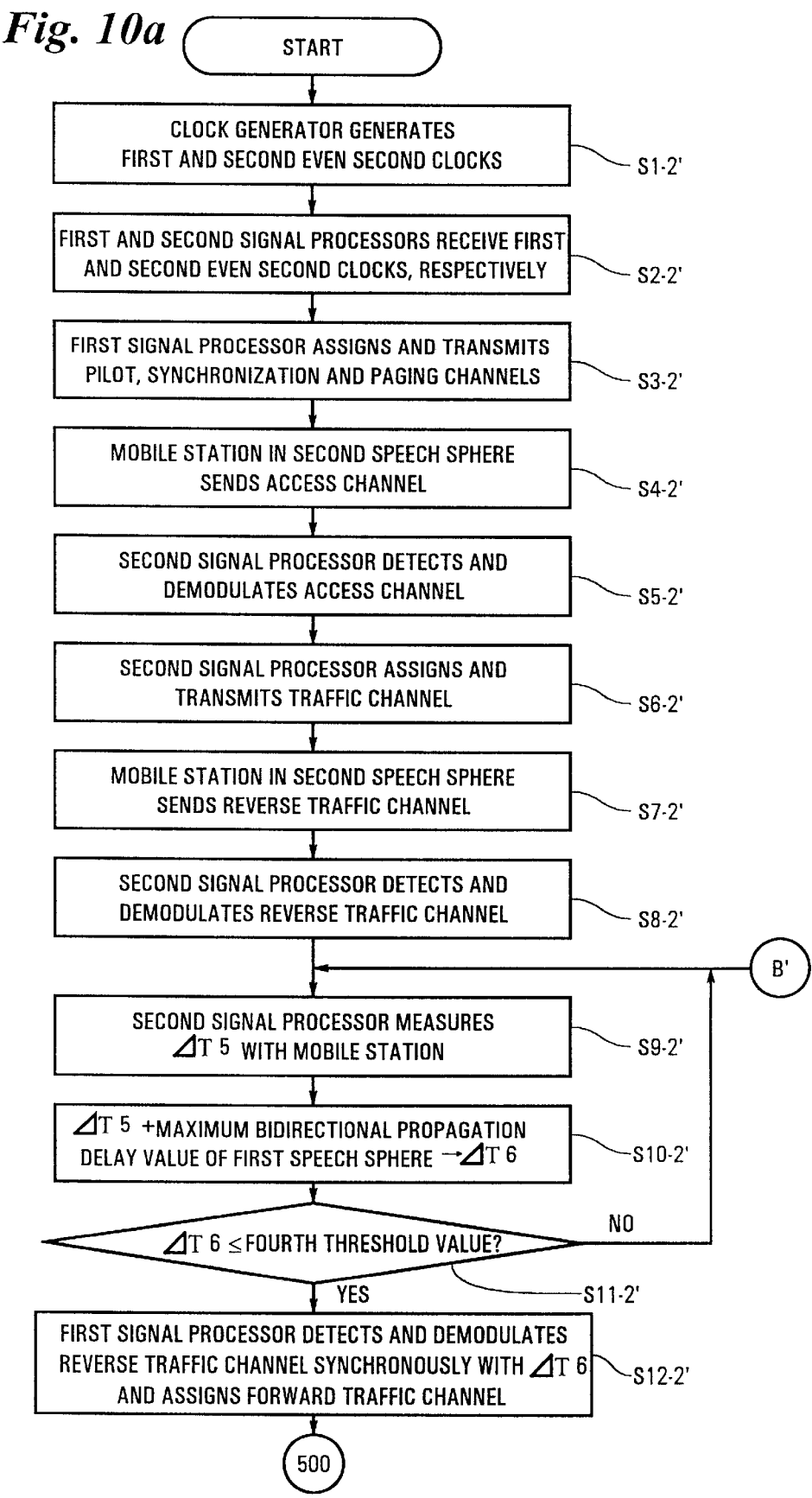

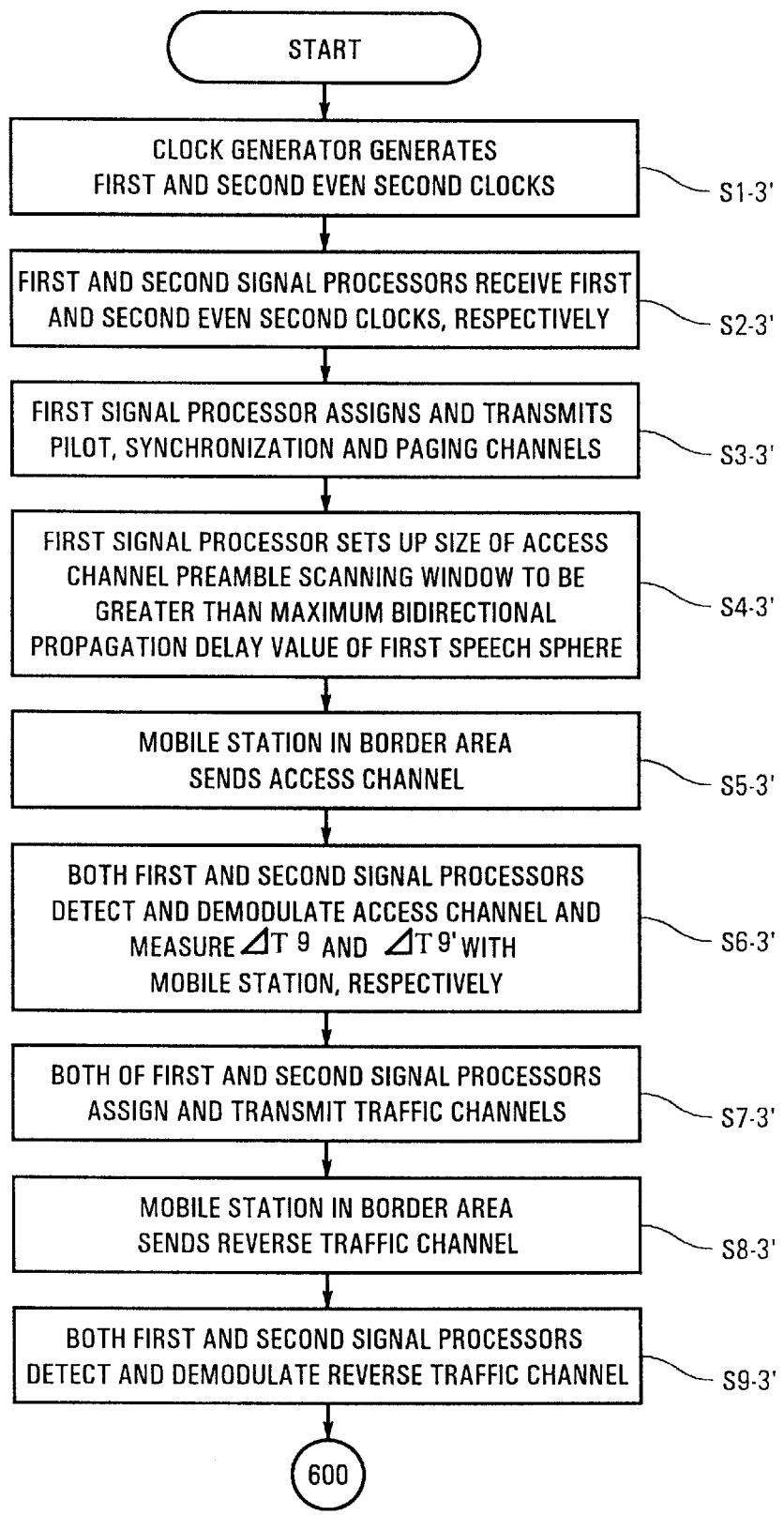

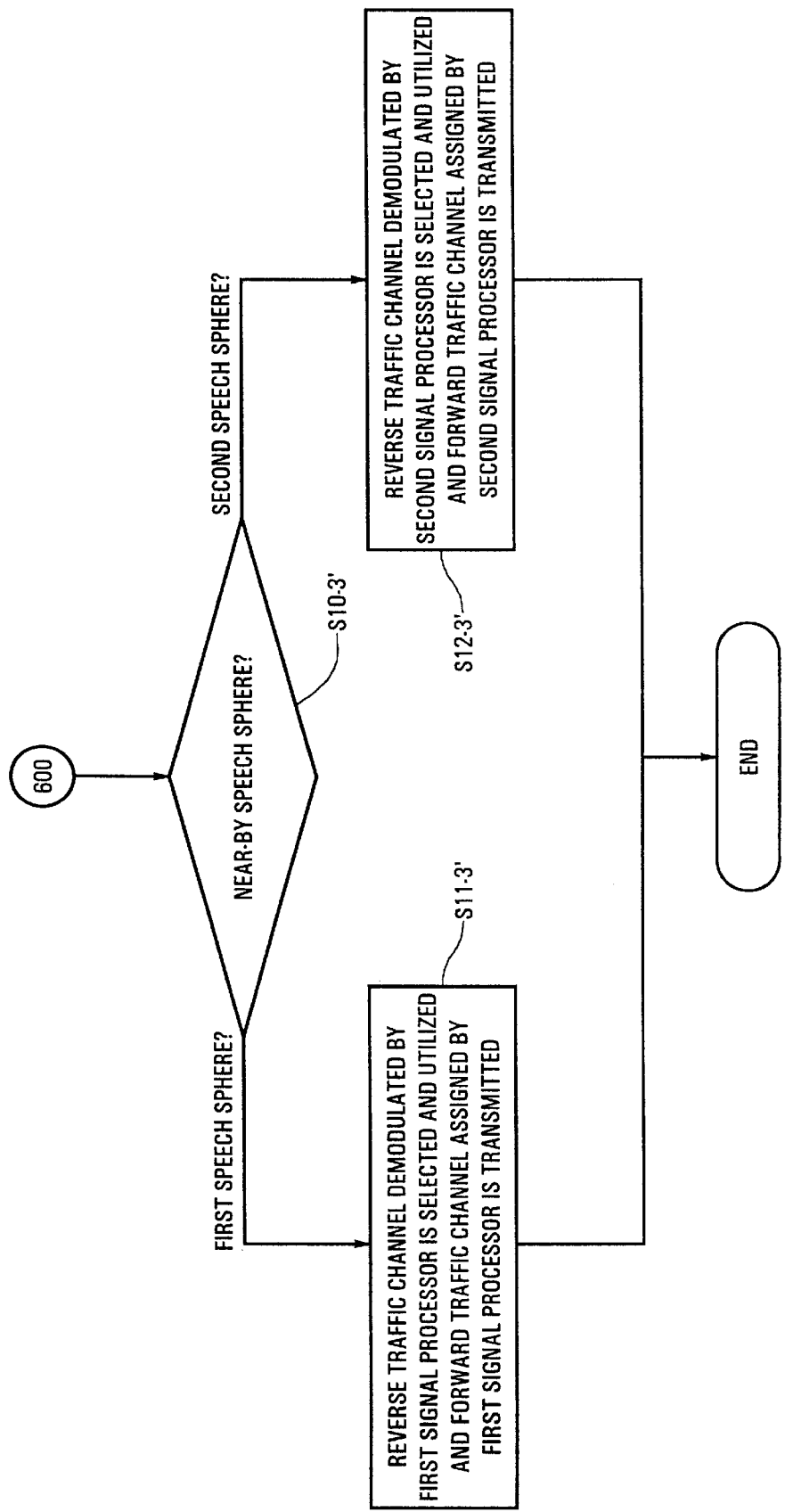

METHOD FOR OPERATING BASE STATION TO SOLVE SPEECH DISABLE STATE BASED ON INTER-SPEECH SPHERE MOVEMENT OF MOBILE STATION IN ENLARGING SPEECH RADIUS LIMITED IN TIMING IN CODE DIVISION MULTIPLE ACCESS MOBILE COMMUNICATION SYSTEM

BACKGROUND OF THE INVENTION

1. Field of the Invention

The present invention relates in general to a method for operating a base station in a code division multiple access (CDMA) mobile communication system, and more particularly to a method for operating abase station to solve a call discontinuity, or speech disable state, based on the inter-speech sphere movement of a mobile station in enlarging a speech radius limited in timing in a CDMA mobile communication system.

2. Description of the Prior Art

In a conventional CDMA mobile communication system, all mobile stations and base stations are timed with a reference time of the CDMA system. A mobile station obtains timing information from a message sent from a base station and sets a reference time on the basis of the obtained timing information for synchronization with the base station. At this time, the reference time set by the mobile station is a value delayed from a reference time of the base station due to a propagation delay from the base station to the mobile station and a signal process delay of the mobile station. Further, the mobile station sends a signal synchronously with the set self reference time, and such a reverse link signal is delayed for a propagation delay time and then received by the base station. As a result, the base station sends a forward link signal synchronously with a system reference clock, but receives a reverse link signal with a time delay (referred to hereinafter as "bidirectional propagation delay") from the system reference clock.

In the CDMA system, the maximum allowable value of such a bidirectional propagation delay is limited in a hardware manner by a modem application specific integrated circuit (ASIC) of the base station. The maximum allowable value is about 416 $\mu s$, which is about 62 Km (416 $\mu$dlight velocity/2) when it is calculated in terms of cell speech radii in an open area. Consequently, the maximum allowable cell speech radius is limited in timing by the base station modem ASIC.

A method for enlarging the cell speech radius limited in timing by the hardware of the base station modem ASIC as mentioned above is shown in Korean Patent Application No. 98-36239, filed by this applicant.

FIG. 3 shows a service area for speech radius enlargement and call processing. As shown in this drawing, a speech radius, which is wider than that limited in timing by the hardware of the base station modem ASIC in the CDMA mobile communication system, is partitioned by a predetermined unit into first and second speech spheres 110 and 120. The predetermined unit signifies a value below the maximum cell speech radius limited in timing by the hardware of the base station modem ASIC. In this regard, the above speech radius may be partitioned into a different number of speech spheres.

With reference to FIG. 1, there is shown in block form an example of a base station for speech radius enlargement in a CDMA mobile communication system. As shown in this drawing, the base station comprises a clock generator 200, first and second signal processors 300 and 310 and radio frequency (RF) signal processing means 400.

The clock generator 200 receives a 10 MHz signal, time of day (TOD) signal and 1 pulse per second (PPS) signal from a global positioning system (GPS) receiver 100 and generates a first EVEN SECOND clock synchronously with the 1 PPS signal and a second EVEN SECOND clock, which is delayed from the first EVEN SECOND clock by the maximum bidirectional propagation delay value of the first speech sphere 110, as shown in FIG. 2.

The first signal processor 300 assigns pilot, synchronization, paging and traffic channels covering both of the first and second speech spheres 110 and 120 synchronously with the first EVEN SECOND clock from the clock generator 200 and outputs the assigned channels to the RF signal processing means 400. The first signal processor 300 further detects and demodulates only access and traffic channels, which are sent from mobile stations located in the first speech sphere 110 to the base station, synchronously with the first EVEN SECOND clock from the clock generator 200.

The second signal processor 310 detects and demodulates only access and traffic channels, which are sent from mobile stations located in the second speech sphere 120 to the base station, synchronously with the second EVEN SECOND clock from the clock generator 200.

Each of the first and second signal processors 300 and 310 includes at least one channel card 303 and an analog modulator/demodulator circuit 315, as shown in FIG. 5. The channel card 303 is composed of at least one channel element 305 containing a set of base station modem ASICs (commercially available from, for example, QUALCOMM company) 306 for modulating and demodulating digital signals, and a channel card processor 304 for controlling the channel element 305. The analog modulator/demodulator circuit 315 includes a digital/analog (D/A) converter 307 for converting a digital signal from the channel card 303 into an analog signal, a quadrature phase shift keying (QPSK) modulator 309 for modulating the analog signal from the D/A converter 307 in a QPSK manner, a QPSK demodulator 313 for demodulating an RF signal in the QPSK manner, and an analog/digital (A/D) converter 308 for converting a QPSK-demodulated signal into a digital signal. The channel card 303 also receives the first or second EVEN SECOND clock from the clock generator 200.

On the other hand, in each of the first and second signal processors 300 and 310, each channel card is provided with a corresponding one of a channel element for the process of a forward channel and a channel element for the process of a reverse channel. Alternatively, each channel card may be provided with both of the channel elements.

The RF signal processing means 400 includes an RF transmitter 410 for receiving forward link channel signals from the first signal processor 300, to be transmitted to mobile stations, modulating the received signals into RF signals and transmitting the modulated RF signals through a transmission antenna 500, and an RF receiver 420 for receiving reverse link channel signals from the mobile stations through reception antennas 510 and 513 of the base station, RF-demodulating the received signals and transferring the resultant signals to the first and second signal processors 300 and 310, respectively.

Now, a description will be given of the cell speech radius enlarging method of the 98-36239 patent application, which is performed by the base station with the above-mentioned construction.

First, the clock generator 200 receives the 10 MHz signal, TOD signal and 1 PPS signal from the GPS receiver 100 and generates the first EVEN SECOND clock synchronously with the 1 PPS signal. The clock generator 200 further generates the second EVEN SECOND clock delayed from the first EVEN SECOND clock for the maximum bidirectional propagation delay time of the first speech sphere 110.

Then, the first and second signal processors 300 and 310 receive the first and second EVEN SECOND clocks from the clock generator 200, respectively. The first signal processor 300 assigns pilot, synchronization and paging channels synchronously with the received first EVEN SECOND clock and transmits them to all speech spheres belonging to the base station through the RF signal processing means 400 and transmission antenna 500.

At this time, if an access channel is sent from a specific mobile station located in the first speech sphere 110, then it is received at the reception antenna 510 and transferred to the first signal processor 300 through the RF signal processing means 400. As a result, the first signal processor 300 detects and demodulates the access channel, which is sent from the specific mobile station in the first speech sphere 110 to the base station, synchronously with the first EVEN SECOND clock.

Subsequently, the first signal processor 300 assigns a traffic channel synchronously with the first EVEN SECOND clock and transmits it through the RF signal processing means 400 and transmission antenna 500.

Upon receiving the traffic channel transmitted through the antenna 500, the specific mobile station in the first speech sphere 110 assigns a desired traffic channel and sends it to the base station.

Then the traffic channel sent from the specific mobile station in the first speech sphere 110 is received at the reception antenna 510 and transferred to the first signal processor 300 through the RF signal processing means 400. The first signal processor 300 detects and demodulates the transferred traffic channel synchronously with the first EVEN SECOND clock. As a result, a speech state is established between the base station and the specific mobile station in the first speech sphere 110.

On the other hand, in the case where an access channel is sent from a specific mobile station located in the second speech sphere 120 after the first signal processor 300 transmits the pilot, synchronization and paging channels to all mobile stations, it is received at the reception antenna 513 and transferred to the second signal processor 310 through the RF signal processing means 400. As a result, the second signal processor 310 detects and demodulates the access channel from the specific mobile station in the second speech sphere 120 synchronously with the second EVEN SECOND clock.

Subsequently, a channel card processor in the first signal processor 300 assigns one channel element in the processor 300 and, further, a traffic channel synchronously with the first EVEN SECOND clock and transmits the assigned traffic channel externally through the RF signal processing means 400 and transmission antenna 500.

Upon receiving the traffic channel transmitted through the antenna 500, the specific mobile station in the second speech sphere 120 assigns a desired traffic channel and sends it to the base station.

Then, the traffic channel sent from the specific mobile station in the second speech sphere 120 is received at the reception antenna 513 and transferred to the second signal processor 310 through the RF signal processing means 400. The second signal processor 310 detects and demodulates the transferred traffic channel synchronously with the second EVEN SECOND clock. As a result, a speech state is established between the base station and the specific mobile station in the second speech sphere 120.

Further disclosed in the above Korean Patent Application No. 98-36239 is another method for enlarging the cell speech radius limited in timing by the hardware of the base station modem ASIC, which will hereinafter be described in detail.

With reference to FIG. 4, there is shown in block form another example of a base station for speech radius enlargement in a CDMA mobile communication system. As shown in this drawing, the base station comprises a clock generator 200, first and second signal processors 320 and 330 and RF signal processing means 400.

The clock generator 200 receives a 10 MHz signal, TOD signal and 1 PPS signal from a GPS receiver 100 and generates a first EVEN SECOND clock synchronously with the 1 PPS signal and a second EVEN SECOND clock, which is delayed from the first EVEN SECOND clock by the maximum bidirectional propagation delay value of the first speech sphere 110, as shown in FIG. 2.

The first signal processor 320 assigns and transmits pilot, synchronization and paging channels covering both of the first and second speech spheres 110 and 120 and traffic channels covering the first speech sphere 110 on a forward link from the base station to mobile stations synchronously with the first EVEN SECOND clock from the clock generator 200. The first signal processor 320 further detects and demodulates only access and traffic channels, which are sent; from mobile stations located in the first speech sphere 110 to the base station, on a reverse link from the mobile stations to the base station synchronously with the first EVEN SECOND clock from the clock generator 200 to cover only the first speech sphere 110.

The second signal processor 330 advances the second EVEN SECOND clock from the clock generator 200 by a delay time using a timing compensation register in a modem ASIC and assigns and transmits traffic channels to the second speech sphere 120 on the forward link synchronously with the advanced clock. The second signal processor 330 further detects and demodulates only access and traffic channels from mobile stations located in the second speech sphere 120 on the reverse link synchronously with the second EVEN SECOND clock from the clock generator 200 to cover only the second speech sphere 120.

Each of the first and second signal processors 320 and 330 is the same in construction as each of the first and second signal processors 300 and 310 as shown in FIG. 5, with the exception that a timing compensation register is provided in each base station mode ASIC to transmit a traffic channel to a mobile station ahead by a delay time (time for which the second EVEN SECOND clock is delayed from the first EVEN SECOND clock).

The RF signal processing means 400 is substantially the same in construction as that in FIG. 1 and a detailed description thereof will thus be omitted.

Now, a description will be given of the second cell speech radius enlarging method of the 98-36239 patent application, which is performed by the base station with the above-mentioned construction.

First, the clock generator 200 receives the 10 MHz signal, TOD signal and 1 PPS signal from the GPS receiver 100 and generates the first EVEN SECOND clock synchronously with the 1 PPS signal. The clock generator 200 further generates the second EVEN SECOND clock delayed from the first EVEN SECOND clock by the maximum bidirectional propagation delay value of the first speech sphere 110.

Subsequently, the first and second signal processors 320 and 330 receive the first and second EVEN SECOND clocks from the clock generator 200, respectively. The first signal processor 320 assigns pilot, synchronization and paging channels synchronously with the received first EVEN SECOND clock and transmits them to all speech spheres belonging to the base station through the RF signal processing means 400 and transmission antenna 500.

At this time, in the case where an access channel is sent from a specific mobile station located in the first speech sphere 110, it is received at the reception antenna 510 and transferred to the first signal processor 320 through the RF signal processing means 400. Then, the first signal processor 320 detects and demodulates the access channel, which is sent from the specific mobile station in the first speech sphere 110 to the base station, synchronously with the first EVEN SECOND clock.

Then, the first signal processor 320 assigns a traffic channel synchronously with the first EVEN SECOND clock and transmits it through the RF signal processing means 400 and transmission antenna 500.

If the specific mobile station in the first speech sphere 110 receives the traffic channel transmitted through the antenna 500, then it assigns a desired traffic channel and sends it to the base station.

Subsequently, the traffic channel sent from the specific mobile station in the first speech sphere 110 is received at the reception antenna 510 and transferred to the first signal processor 320 through the RF signal processing means 400. The first signal processor 320 detects and demodulates the transferred traffic channel synchronously with the first EVEN SECOND clock. As a result, a speech state is established between the base station and the specific mobile station in the first speech sphere 110.

On the other hand, if an access channel is sent from a specific mobile station located in the second speech sphere 120 after the first signal processor 320 transmits the pilot, synchronization and paging channels to all mobile stations, then it is received at the reception antenna 513 and transferred to the second signal processor 330 through the RF signal processing means 400. As a result, the second signal processor 330 detects and demodulates the access channel from the specific mobile station in the second speech sphere 120 synchronously with the second EVEN SECOND clock.

Subsequently, the second signal processor 330 assigns a traffic channel ahead by a predetermined delay time (time for which the second EVEN SECOND clock is delayed from the first EVEN SECOND clock) and transmits the assigned traffic channel through the RF signal processing means 400 and transmission antenna 500. Upon receiving the traffic channel transmitted through the antenna 500, the specific mobile station in the second speech sphere 120 assigns a desired traffic channel and sends it to the base station.

The traffic channel sent from the specific mobile station in the second speech sphere 120 is received at the reception antenna 513 and transferred to the second signal processor 330 through the RF signal processing means 400. The second signal processor 330 detects and demodulates the transferred traffic channel synchronously with the second EVEN SECOND clock. As a result, a speech state is established between the base station and the specific mobile station in the second speech sphere 120.

However, in the above-mentioned speech radius enlargement methods, when a speech radius wider than a limited speech radius is partitioned into a plurality of speech spheres for the enlargement of the limited speech radius and channel elements are assigned to signal processors for the call processing, a speech disable state, or call discontinuity, may occur as a mobile station moves from one speech sphere to a different speech sphere.

The above-mentioned speech radius enlargement methods have another disadvantage in that a speech disable state may occur when a mobile station is located in a border area between adjacent speech spheres according to the enlargement of a speech radius.

On the other hand, U.S. Pat. No. 5,590,177 shows a technique for preventing an active call from discontinuity when a mobile station suddenly moves from a first speech sphere to a second speech sphere in a radio telephone system.

In the '177 patent, the call discontinuity is prevented by carrying out the step of, in response to the sudden movement of the mobile station from the first speech sphere to the second speech sphere, determining whether the active call is in danger of discontinuity, the step of, in response to the determination, notifying a first base station that the active call is in danger of discontinuity, the step of, in response to the notification, determining whether the active call is present in the first base station and a call discontinuity processor, and the step of, in response to the call discontinuity processor, establishing the active call with a second base station in the second speech sphere prior to discontinuity of the active call with the first base station.

In other words, in the above '177 patent, when the mobile station suddenly moves from the first speech sphere to the second speech sphere, the call discontinuity is prevented by calculating the ratio of the total energy received by the mobile station to signal energy, determining on the basis of the calculated ratio whether the active call is in danger of discontinuity and establishing the active call with the second base station in the second speech sphere in accordance with the determined result. However, this is localized to a general handoff within a limited speech radius.

SUMMARY OF THE INVENTION

Therefore, the present invention has been made in view of the above problems, and it is an object of the present invention to provide a method for operating a base station to solve a speech disable state based on the inter-speech sphere movement or border area location of a mobile station in enlarging a speech radius limited in timing by hardware of a base station modem ASIC in a CDMA mobile communication system.

In accordance with one aspect of the present invention, in a method for operating a CDMA base station which partitions a speech radius wider than that limited in timing by a modem ASIC of the base station into first and second speech spheres by a predetermined unit below the maximum speech radius allowed by the base station mode m ASIC to enlarge the limited speech radius, the base station having a first signal processor for processing forward link channels from the base station to mobile stations in the first and second speech spheres and reverse link channels from the mobiles stat ions in the first speech sphere to the base station and a second signal processor for processing reverse link channels from the mobile stations in the second speech sphere to the base station, there is provided a method for solving a speech disable state based on the movement of a specific mobile station located in the first speech sphere to the second speech sphere, comprising the first step of allowing a clock generator to generate first and second EVEN SECOND clocks, the second EVEN SECOND clock being delayed from the first EVEN SECOND clock by the maximum bidirectional propagation delay value of the first speech sphere, and allowing the first and second signal processors to receive the first and second EVEN SECOND clocks from the clock generator, respectively; the second step of allowing the first signal processor to assign pilot, synchronization and paging channels synchronously with the first EVEN SECOND clock and transmit them to all speech spheres covered by the base station; the third step of, if an access channel is sent from the specific mobile station located in the first speech sphere, allowing the first signal processor to detect and demodulate the access channel synchronously with the first EVEN SECOND clock; the fourth step of allowing the first signal processor to assign a traffic channel synchronously with the first EVEN SECOND clock and transmit it to the specific mobile station in the first speech sphere; the fifth step of, if a reverse traffic channel is sent from the specific mobile station in the first speech sphere, allowing the first signal processor to detect and demodulate the reverse traffic channel synchronously with the first EVEN SECOND clock; the sixth step of allowing the first signal processor to measure a first bidirectional propagation delay time with the specific mobile station at an interval of predetermined time and compare the measured first bidirectional propagation delay time with a first threshold value; the seventh step of allowing the first signal processor to repeatedly measure the first bidirectional propagation delay time if the first bidirectional propagation delay time is smaller than the first threshold value at the above sixth step and, if the first bidirectional propagation delay time is greater than or equal to the first threshold value at the above sixth step, allowing the first signal processor to subtract the maximum bidirectional propagation delay value of the first speech sphere from the first bidirectional propagation delay time and set the subtracted result as a second bidirectional propagation delay time; the eighth step of allowing the second signal processor to detect and demodulate the reverse traffic channel from the specific mobile station synchronously with the second bidirectional propagation delay time; the ninth step of allowing the first signal processor to compare the first bidirectional propagation delay time with a second threshold value; and the tenth step of selecting and utilizing the reverse traffic channel demodulated by the second signal processor if the first bidirectional propagation delay time is greater than or equal to the second threshold value at the above ninth step.

In accordance with another aspect of the present invention, in a method for operating a CDMA base station which partitions a speech radius wider than that limited in timing by a modem ASIC of the base station into first and second speech spheres by a predetermined unit below the maximum speech radius allowed by the base station modem ASIC to enlarge the limited speech radius, the base station having a first signal processor for processing forward link channels from the base station to mobile stations in the first and second speech spheres and reverse link channels from the mobile stations in the first speech sphere to the base station and a second signal processor for processing reverse link channels from the mobile stations in the second speech sphere to the base station, there is provided a method for solving a speech disable state based on the movement of a specific mobile station located in the second speech sphere to the first speech sphere, comprising the first step of allowing a clock generator to generate first and second EVEN SECOND clocks, the second EVEN SECOND clock being delayed from the first EVEN SECOND clock by the maximum bidirectional propagation delay value of the first speech sphere, and allowing the first and second signal processors to receive the first and second EVEN SECOND clocks from the clock generator, respectively; the second step of allowing the first signal processor to assign pilot, synchronization and paging channels synchronously with the first EVEN SECOND clock and transmit them to all speech spheres covered by the base station; the third step of, if an access channel is sent from the specific mobile station located in the second speech sphere, allowing the second signal processor to detect and demodulate the access channel synchronously with the second EVEN SECOND clock; the fourth step of allowing the first signal processor to assign a traffic channel synchronously with the second EVEN SECOND clock and transmit it to the specific mobile station in the second speech sphere; the fifth step of, if a reverse traffic channel is sent from the specific mobile station in the second speech sphere, allowing the second signal processor to detect and demodulate the reverse traffic channel synchronously with the second EVEN SECOND clock; the sixth step of allowing the second signal processor to measure a first bidirectional propagation delay time with the specific mobile station at an interval of predetermined time, add the maximum bidirectional propagation delay value of the first speech sphere to the measured first bidirectional propagation delay time and set the added result as a second bidirectional propagation delay time; the seventh step of allowing the second signal processor to compare the second bidirectional propagation delay time with a first threshold value; the eighth step of returning to the above sixth step if the second bidirectional propagation delay time is greater than the first threshold value at the above seventh step and allowing the first signal processor to detect and demodulate the reverse traffic channel from the specific mobile station synchronously with the second bidirectional propagation delay time if the second bidirectional propagation delay time is smaller than or equal to the first threshold value at the above seventh step; the ninth step of allowing the second signal processor to compare the second bidirectional propagation delay time with a second threshold value; and the tenth step of selecting and utilizing the reverse traffic channel demodulated by the first signal processor if the seconds bidirectional propagation delay time is smaller than or equal to the second threshold value at the above ninth step.

In accordance with a further aspect of the present invention, in a method for operating a CDMA base station which partitions a speech radius wider than that limited in timing by a modem ASIC of the base station into first and second speech spheres by a predetermined unit below the maximum speech radius allowed by the base station modem ASIC to enlarge the limited speech radius, the base station having a first signal processor for processing forward link channels from the base station to mobile stations in the first and second speech spheres and reverse link channels from the mobile stations in the first speech sphere to the base station and a second signal processor for processing reverse link channels from the mobile stations in the second speech sphere to the base station, there is provided a method for solving a speech disable state based on the location of a specific mobile station in a border area between the first and second speech spheres, comprising the first step of allowing a clock generator to generate first and second EVEN SECOND clocks, the second EVEN SECOND clock being delayed from the first EVEN SECOND clock by the maximum bidirectional propagation delay value of the first speech sphere, and allowing the first and second signal processors to receive the first and second EVEN SECOND clocks from the clock generator, respectively; the second step of allowing the first signal processor to assign pilot, synchronization and paging channels synchronously with the first EVEN SECOND clock and transmit them to all speech spheres covered by the base station; the third step of allowing the first signal processor to set up the size of an access channel preamble scanning window to be greater than the maximum bidirectional propagation delay value of the first speech sphere; the fourth step of, if an access channel is sent from the specific mobile station in the border area, allowing both of the first and second signal processors to detect and demodulate the access channel synchronously, respectively, with the first and second EVEN SECOND clocks and measure first and second bidirectional propagation delay times with the specific mobile station, respectively; the fifth step of allowing the first signal processor to assign a traffic channel synchronously with the first EVEN SECOND clock and transmit it to the specific mobile station; the sixth step of, if a reverse traffic channel is sent from the specific mobile station, allowing both of the first and second signal processors to detect and demodulate the reverse traffic channel synchronously, respectively, with the first and second EVEN SECOND clocks; the seventh step of comparing the first and second bidirectional propagation delay times measured at the above fourth step with each other to determine which one of the first and second speech spheres is a near-by speech sphere; and the eighth step of selecting and utilizing the reverse traffic channel demodulated by the first signal processor if the first speech sphere is determined to be the near-by speech sphere at the above seventh step and selecting and utilizing the reverse traffic channel demodulated by the second signal processor if the second speech sphere is determined to be the near-by speech sphere at the above seventh step.

In accordance with another aspect of the present invention, in a method for operating a CDMA base station which partitions a speech radius wider than that limited in timing by a modem ASIC of the base station into first and second speech spheres by a predetermined unit below the maximum speech radius allowed by the base station modem ASIC to enlarge the limited speech radius, the base station having a first signal processor for processing forward link channels from the base station to mobile stations in the first and second speech spheres and reverse link channels from the mobile stations in the first speech sphere to the base station and a second signal processor for processing reverse link channels from the mobile stations in the second speech sphere to the base station, there is provided a method for solving a speech disable state based on the movement of a specific mobile station located in the first speech sphere to the second speech sphere, comprising the first step of allowing a clock generator to generate first and second EVEN SECOND clocks, the second EVEN SECOND clock being delayed from the first EVEN SECOND clock by the maximum bidirectional propagation delay value of the first speech sphere, and allowing the first and second signal processors to receive the first and second EVEN SECOND clocks from the clock generator, respectively; the second step of allowing the first signal processor to assign pilot, synchronization and paging channels synchronously with the first EVEN SECOND clock and transmit them to all speech spheres covered by the base station; the third step of, if an access channel is sent from the specific mobile station located in the first speech sphere, allowing the first signal processor to detect and demodulate the access channel synchronously with the first EVEN SECOND clock; the fourth step of allowing the first signal processor to assign a forward traffic channel synchronously with the first EVEN SECOND clock and transmit it to the specific mobile station in the first speech sphere; the fifth step of, if a reverse traffic channel is sent from the specific mobile station in the first speech sphere, allowing the first signal processor to detect and demodulate the reverse traffic channel synchronously with the first EVEN SECOND clock; the sixth step of allowing the first signal processor to measure a first bidirectional propagation delay time with the specific mobile station at an interval of predetermined time and compare the measured first bidirectional propagation delay time with a first threshold value; the seventh step of allowing the first signal processor to repeatedly measure the first bidirectional propagation delay time if the first bidirectional propagation delay time is smaller than the first threshold value at the above sixth step and, if the first bidirectional propagation delay time is greater than or equal to the first threshold value at the above sixth step, allowing the first signal processor to subtract the maximum bidirectional propagation delay value of the first speech sphere from the first bidirectional propagation delay time and set the subtracted result as a second bidirectional propagation delay time; the eighth step of allowing the second signal processor to detect and demodulate the reverse traffic channel from the specific mobile station synchronously with the second bidirectional propagation delay time and assign a forward traffic channel ahead; the ninth step of allowing the second signal processor to compare the second bidirectional propagation delay time with a second threshold value; and the tenth step of, if the second bidirectional propagation delay time is greater than or equal to the second threshold value at the above ninth step, selecting and utilizing the reverse traffic channel demodulated by the second signal processor and then transmitting the forward traffic channel assigned by the second signal processor to the specific mobile station.

In accordance with a further aspect of the present invention, in a method for operating a CDMA base station which partitions a speech radius wider than that limited in timing by a modem ASIC of the base station into first and second speech spheres by a predetermined unit below the maximum speech radius allowed by the base station modem ASIC to enlarge the limited speech radius, the base station having a first signal processor for processing forward link channels from the base station to mobile stations in the first and second speech spheres and reverse link channels from the mobile stations in the first speech sphere to the base station and a second signal processor for processing reverse link channels from the mobile stations in the second speech sphere to the base station, there is provided a method for solving a speech disable state based on the movement of a specific mobile station located in the second speech sphere to the first speech sphere, comprising the first step of allowing a clock generator to generate first and second EVEN SECOND clocks, the second EVEN SECOND clock being delayed from the first EVEN SECOND clock by the maximum bidirectional propagation delay value of the first speech sphere, and allowing the first and second signal processors to receive the first and second EVEN SECOND clocks from the clock generator, respectively; the second step of allowing the first signal processor to assign pilot, synchronization and paging channels synchronously with the first EVEN SECOND clock and transmit them to all speech spheres covered by the base station; the third step of, if an access channel is sent from the specific mobile station located in the second speech sphere, allowing the second signal processor to detect and demodulate the access channel synchronously with the second EVEN SECOND clock; the fourth step of allowing the second signal processor to assign a forward traffic channel ahead and transmit it to the specific mobile station in the second speech sphere; the fifth step of, if a reverse traffic channel is sent from the specific mobile station in the second speech sphere, allowing the second signal processor to detect and demodulate the reverse traffic channel synchronously with the second EVEN SECOND clock; the sixth step of allowing the second signal processor to measure a first bidirectional propagation delay time with the specific mobile station at an interval of predetermined time, add the maximum bidirectional propagation delay value of the first speech sphere to the measured first bidirectional propagation delay time and set the added result as a second bidirectional propagation delay time; the seventh step of allowing the second signal processor to compare the second bidirectional propagation delay time with a first threshold value; the eighth step of returning to the above sixth step if the second bidirectional propagation delay time is greater than the first threshold value at the above seventh step and, if the second bidirectional propagation delay time is smaller than or equal to the first threshold value at the above seventh step, allowing the first signal processor to detect and demodulate the reverse traffic channel from the specific mobile station synchronously with the second bidirectional propagation delay time and to assign a forward traffic channel; the ninth step of allowing the second signal processor to compare the second bidirectional propagation delay time with a second threshold value; and the tenth step of, if the second bidirectional propagation delay time is smaller than or equal to the second threshold value at the above ninth step, selecting and utilizing the reverse traffic channel demodulated by the first signal processor and transmitting the forward traffic channel assigned by the first signal processor to the specific mobile station.

In accordance with yet another aspect of the present invention, in a method for operating a CDMA base station which partitions a speech radius wider than that limited in timing by a modem ASIC of the base station into first and second speech spheres by a predetermined unit below the maximum speech radius allowed by the base station modem ASIC to enlarge the limited speech radius, the base station having a first signal processor for processing forward link channels from the base station to mobile stations in the first and second speech spheres and reverse link channels from the mobile stations in the first speech sphere to the base station and a second signal processor for processing reverse link channels from the mobile stations in the second speech sphere to the base station, there is provided a method for solving a speech disable state based on the location of a specific mobile station in a border area between the first and second speech spheres, comprising the first step of allowing a clock generator to generate first and second EVEN SECOND clocks, the second EVEN SECOND clock being delayed from the first EVEN SECOND clock by the maximum bidirectional propagation delay value of the first speech sphere, and allowing the first and second signal processors to receive the first and second EVEN SECOND clocks from the clock generator, respectively; the second step of allowing the first signal processor to assign pilot, synchronization and paging channels synchronously with the first EVEN SECOND clock and transmit them to all speech spheres covered by the base station; the third step of allowing the first signal processor to set up the size of an access channel preamble scanning window to be greater than the maximum bidirectional propagation delay value of the first speech sphere; the fourth step of, if an access channel is sent from the specific mobile station in the border area, allowing both of the first and second signal processors to detect and demodulate the access channel synchronously, respectively, with the first and second EVEN SECOND clocks and measure first and second bidirectional propagation delay times with the specific mobile station, respectively; the fifth step of allowing both of the first and second signal processors to assign forward traffic channels and transmit them to the specific mobile station; the sixth step of, if a reverse traffic channel is sent from the specific mobile station, allowing both of the first and second signal processors to detect and demodulate the reverse traffic channel synchronously, respectively, with the first and second EVEN SECOND clocks; the seventh step of comparing the first and second bidirectional propagation delay times measured at the above fourth step with each other to determine which one of the first and second speech spheres is a near-by speech sphere; and the eighth step of, if the first speech sphere is determined to be the near-by speech sphere at the above seventh step, selecting and utilizing the reverse traffic channel demodulated by the first signal processor and transmitting the forward traffic channel assigned by the first signal processor to the specific mobile station and, if the second speech sphere is determined to be the near-by speech sphere at the above seventh step, selecting and utilizing the reverse traffic channel demodulated by the second signal processor and transmitting the forward traffic channel assigned by the second signal processor to the specific mobile station.

BRIEF DESCRIPTION OF THE DRAWINGS

The above and other objects, features and advantages of the present invention will be more clearly understood from the following detailed description taken in conjunction with the accompanying drawings, in which:

FIGS. 10a and 10b are flowcharts illustrating a method for operating the base station to solve a speech disable state based on the movement of a mobile station from the second speech sphere to the first speech sphere in accordance with the second embodiment of the present invention; and FIGS. 11a and 11b are flowcharts illustrating a method for operating the base station to solve a speech disable state based on the location of a mobile station in a border area between the first and second speech spheres in accordance with the second embodiment of the present invention.

DETAILED DESCRIPTION OF THE PREFERRED EMBODIMENTS

Figure 6A:
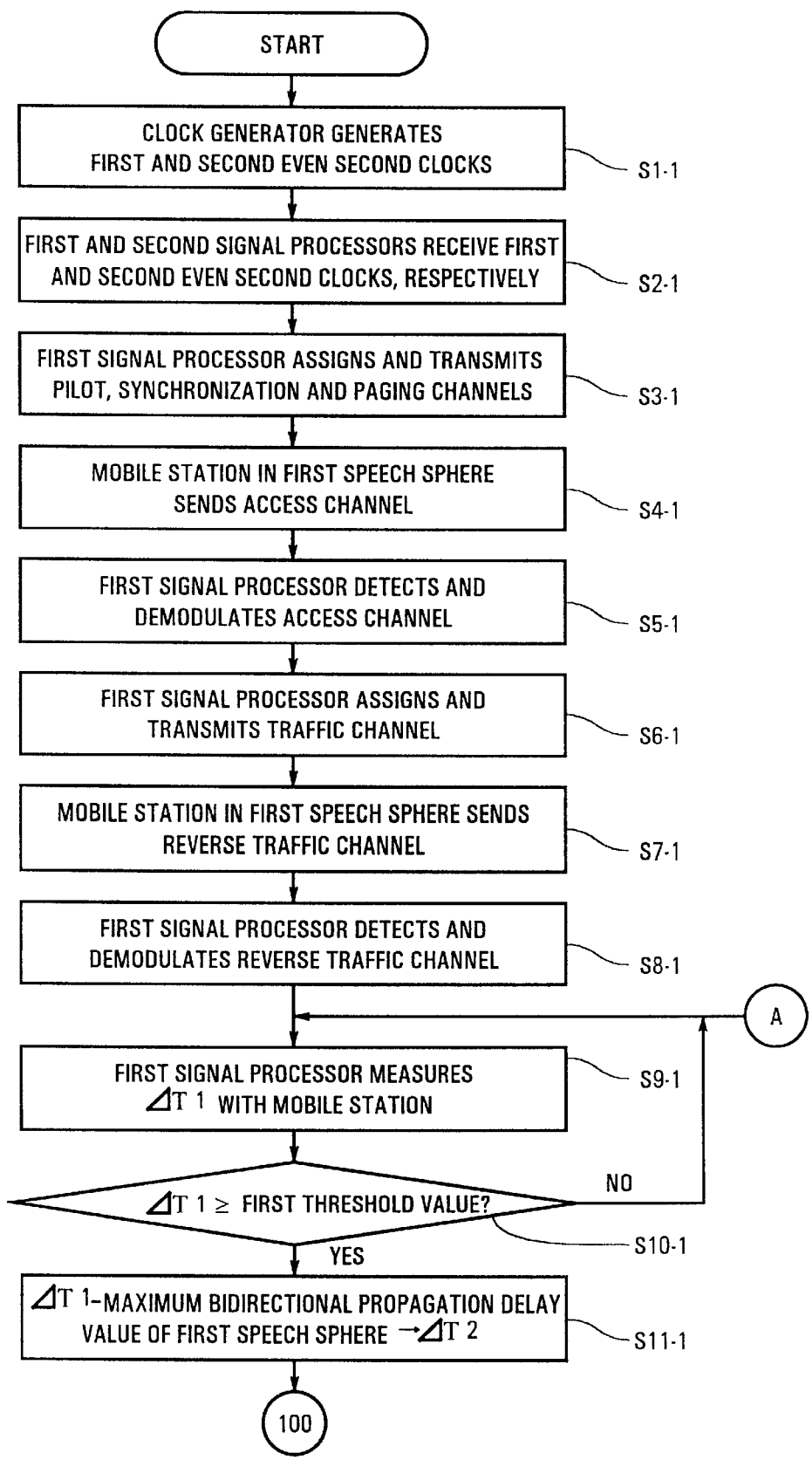
FIGS. 6a and 6b are flowcharts illustrating a method for operating a base station to solve a speech disable state based on the movement of a mobile station from a first speech sphere to a second speech sphere in accordance with a first embodiment of the present invention.
Figure 6B:
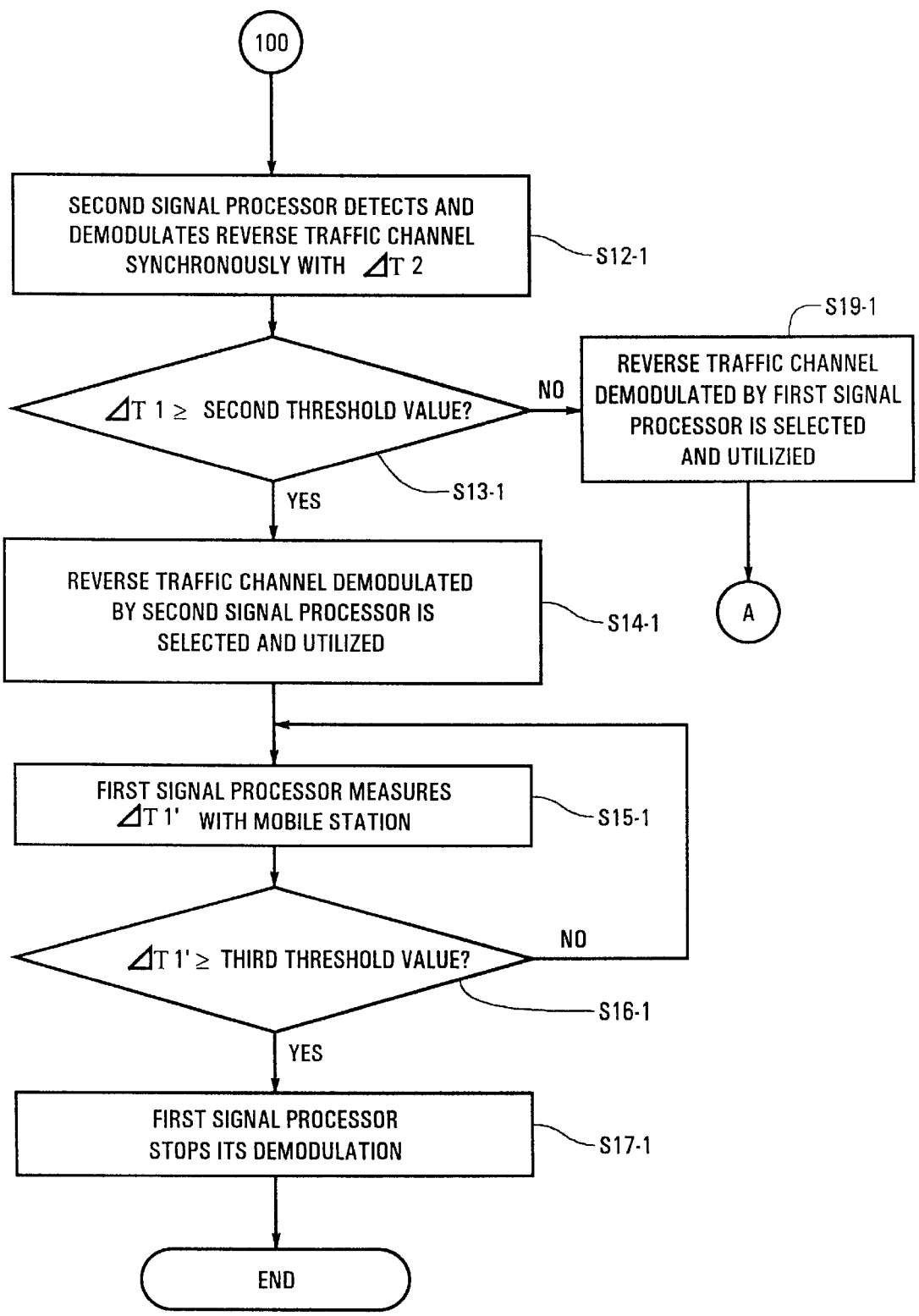

FIGS. 6a and 6b are flowcharts illustrating a method for operating a base station to solve a speech disable state based on the movement of a specific mobile station located in the first speech sphere 110 to the second speech sphere 120 in accordance with a first embodiment of the present invention.

Figure 1:
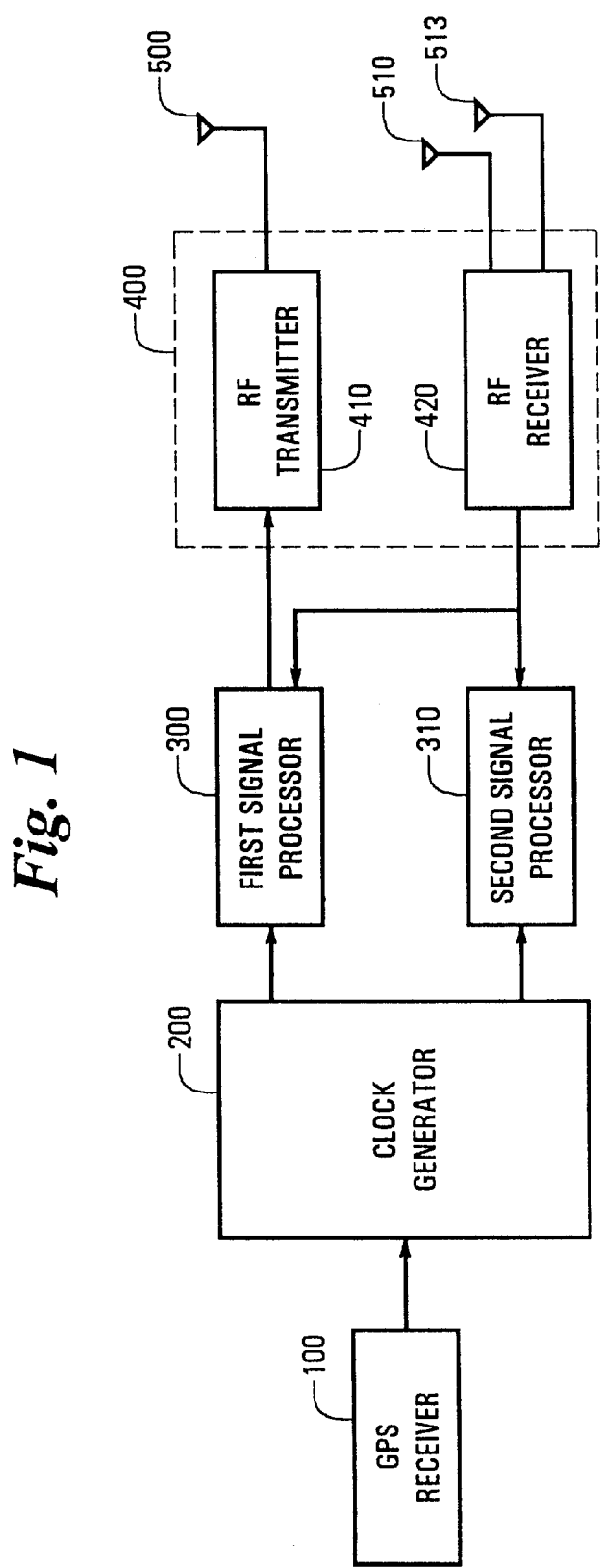
FIG. 1 is a block diagram of an example of a base station for speech radius enlargement in a CDMA mobile communication system.
Figure 2:
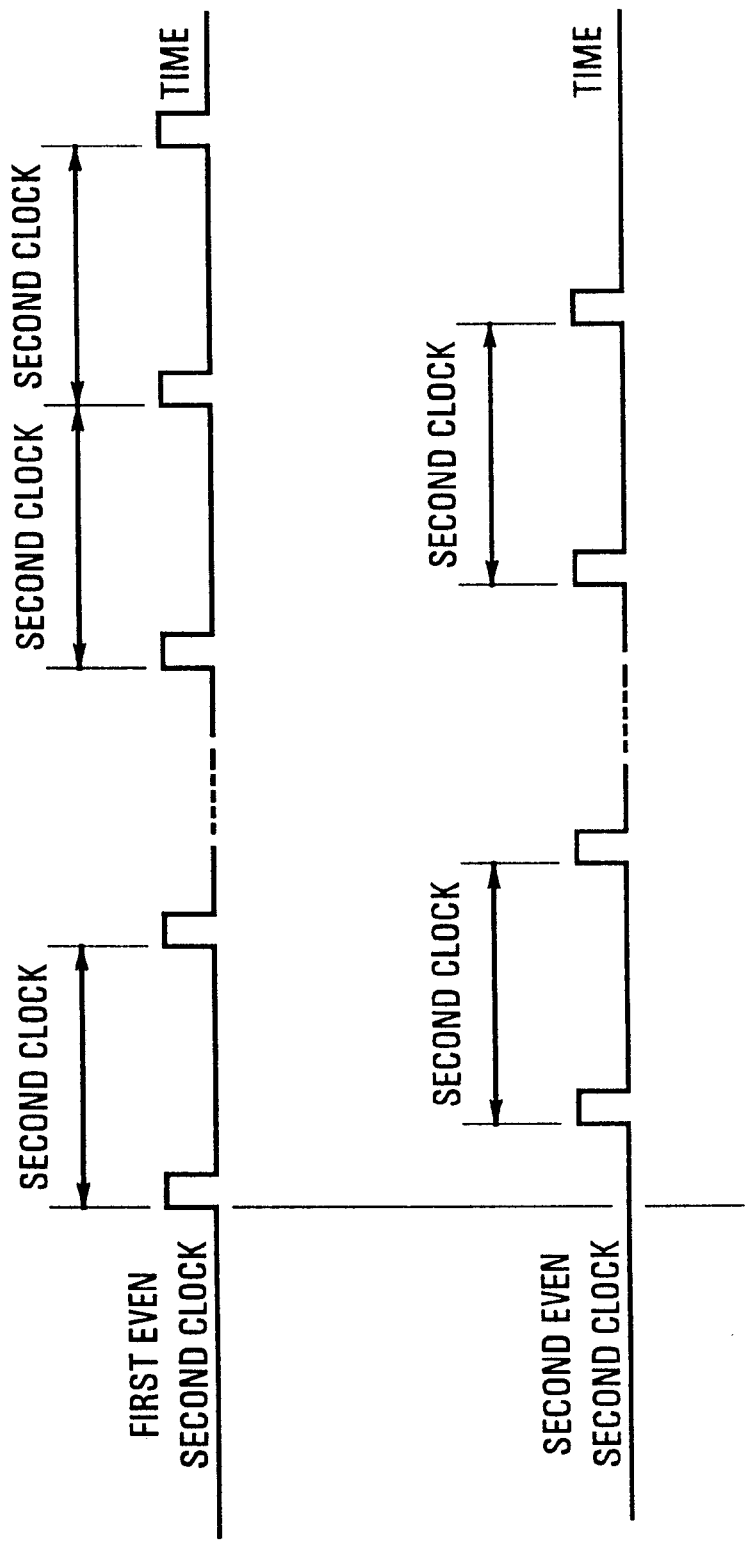
FIG. 2 is a timing diagram of first and second EVEN SECOND clocks generated by a clock generator in FIG. 1.
Figure 3:
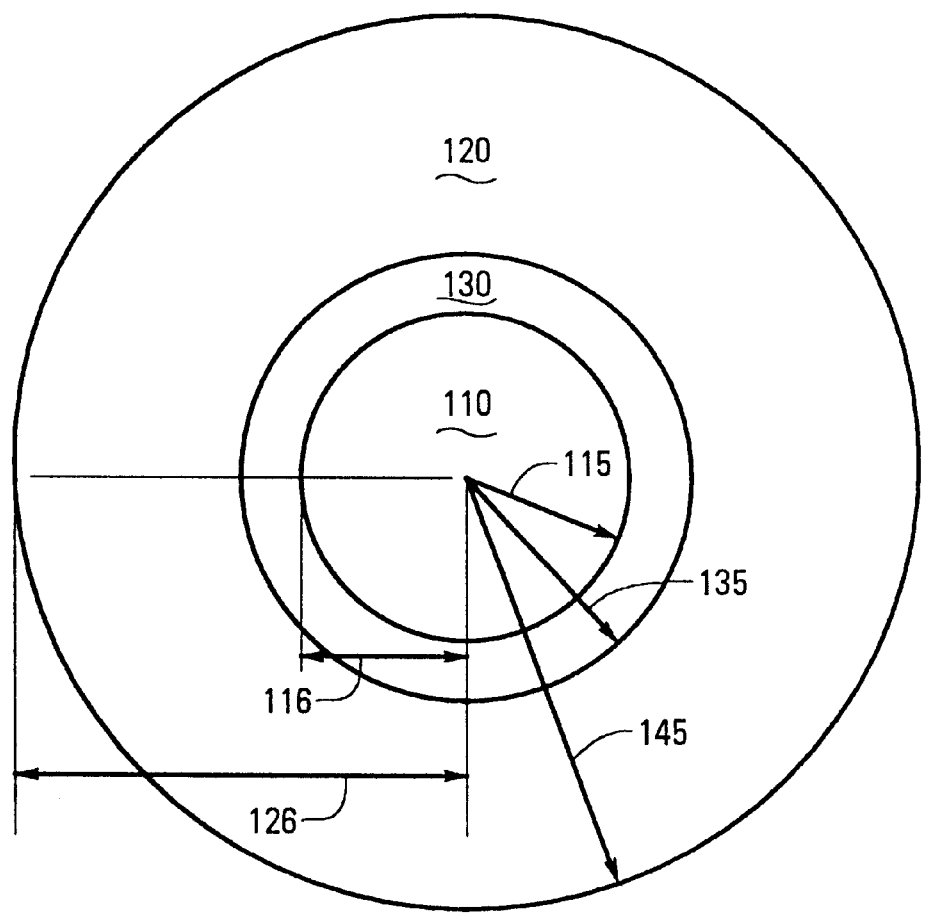
FIG. 3 is a view showing a service area for speech radius enlargement and call processing.

The base station applied to the first embodiment of the present invention is the same in construction as that of FIG. 1 and a detailed description thereof will thus be omitted.

With reference to FIGS. 6a and 6b, first, the clock generator 200 generates the first EVEN SECOND clock and the second EVEN SECOND clock, which is delayed from the first EVEN SECOND clock by the maximum bidirectional propagation delay value of the first speech sphere 110, at step S1-1. Then, the first and second signal processors 300 and 310 receive the first and second EVEN SECOND clocks from the clock generator 200, respectively, at step S2-1.

The first signal processor 300 assigns pilot, synchronization and paging channels synchronously with the first EVEN SECOND clock and transmits them to all speech spheres covered by the base station at step S3-1. If an access channel is sent from the specific mobile station located in the first speech sphere 110 at step S4-1, then it is detected and demodulated by the first signal processor 300 synchronously with the first EVEN SECOND clock at step S5-1.

Subsequently, the first signal processor 300 assigns a traffic channel synchronously with the first EVEN SECOND clock and transmits it to the specific mobile station in the first speech sphere 110 at step S6-1.

If a reverse traffic channel is sent from the specific mobile station in the first speech sphere 110 at step S7-1, then it is detected and demodulated by the first signal processor 300 synchronously with the first EVEN SECOND clock at step S8-1.

Then, the first signal processor 300 measures a bidirectional propagation delay time $\Delta T1$ with the specific mobile station at an interval of predetermined time at step S9-1 and compares the measured value $\Delta T1$ with a first threshold value (greater than the maximum bidirectional propagation delay value of the first speech sphere and smaller than the maximum bidirectional propagation delay value limited by a modem ASIC) at step S10-1.

If the measured value $\Delta T1$ is smaller than the first threshold value, or NO at the above step S10-1, the operation returns to the above step S9-1. To the contrary, in the case where the measured value $\Delta T1$ is greater than or equal to the first threshold value, or YES at the above step S10-1, the first signal processor 300 subtracts the maximum bidirectional propagation delay value of the first speech sphere 110 from the measured value $\Delta T1$ and sets the subtracted result as a new bidirectional propagation delay time $\Delta T2$ at step S11-1.

Subsequently, the second signal processor 310 detects and demodulates the reverse traffic channel from the specific mobile station synchronously with the bidirectional propagation delay time $\Delta T2$ at step S12-1.

At this time, the first signal processor 300 compares the measured value $\Delta T1$ with a second threshold value (greater than the first threshold value and smaller than the maximum bidirectional propagation delay value limited by the modem ASIC) at step S13-1.

If the measured value $\Delta T1$ is greater than or equal to the second threshold value, or YES at the above step S13-1, the reverse traffic channel demodulated by the second signal processor 310 is selected and utilized at step S14-1. Thereafter, the first signal processor 300 measures a bidirectional propagation delay time $\Delta T1'$ with the specific mobile station at step S15-1.

The first signal processor 300 then compares the measured value $\Delta T1'$ with a third threshold value (greater than the second threshold value and smaller than the maximum bidirectional propagation delay value limited by the modem ASIC) at step S16-1.

If the measured value $\Delta T1'$ is smaller than the third threshold value, or NO at the above step S16-1, the operation returns to the above step S15-1. To the contrary, in the case where the measured value $\Delta T1'$ is greater than or equal to the third threshold value, or YES at the above step S161, the first signal processor 300 stops its demodulation at step S17-1 and the operation is then ended.

On the other hand, if the measured value $\Delta T1$ is smaller than the second threshold value, or NO at the above step S13-1, the reverse traffic channel demodulated by the first signal processor 300 is selected and utilized at step S19-1 and the operation then returns to the above step 19-1.

Figure 7A:
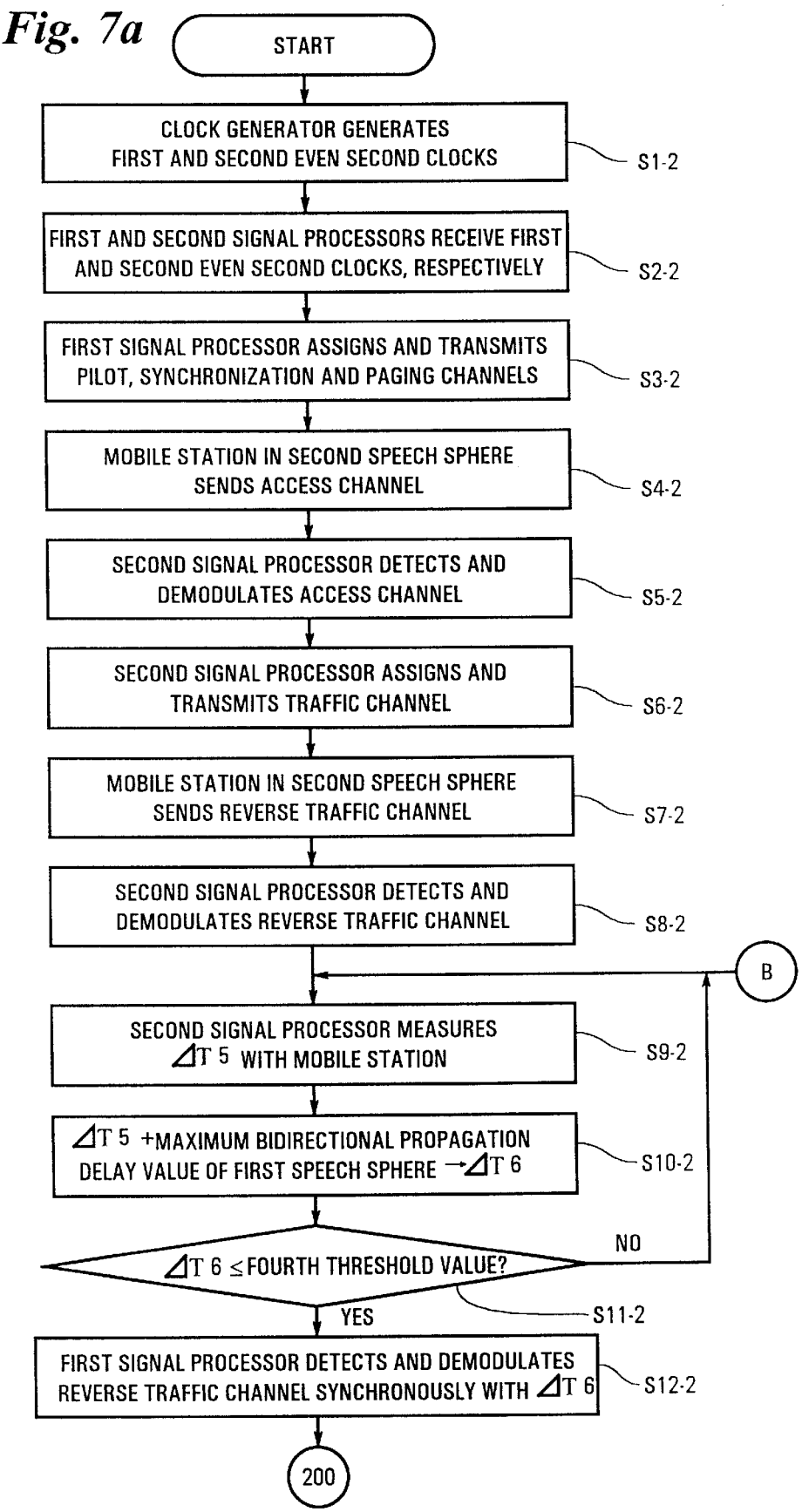
FIGS. 7a and 7b are flowcharts illustrating a method for operating the base station to solve a speech disable state based on the movement of a mobile station from the second speech sphere to the first speech sphere in accordance with the first embodiment of the present invention.
Figure 7B:
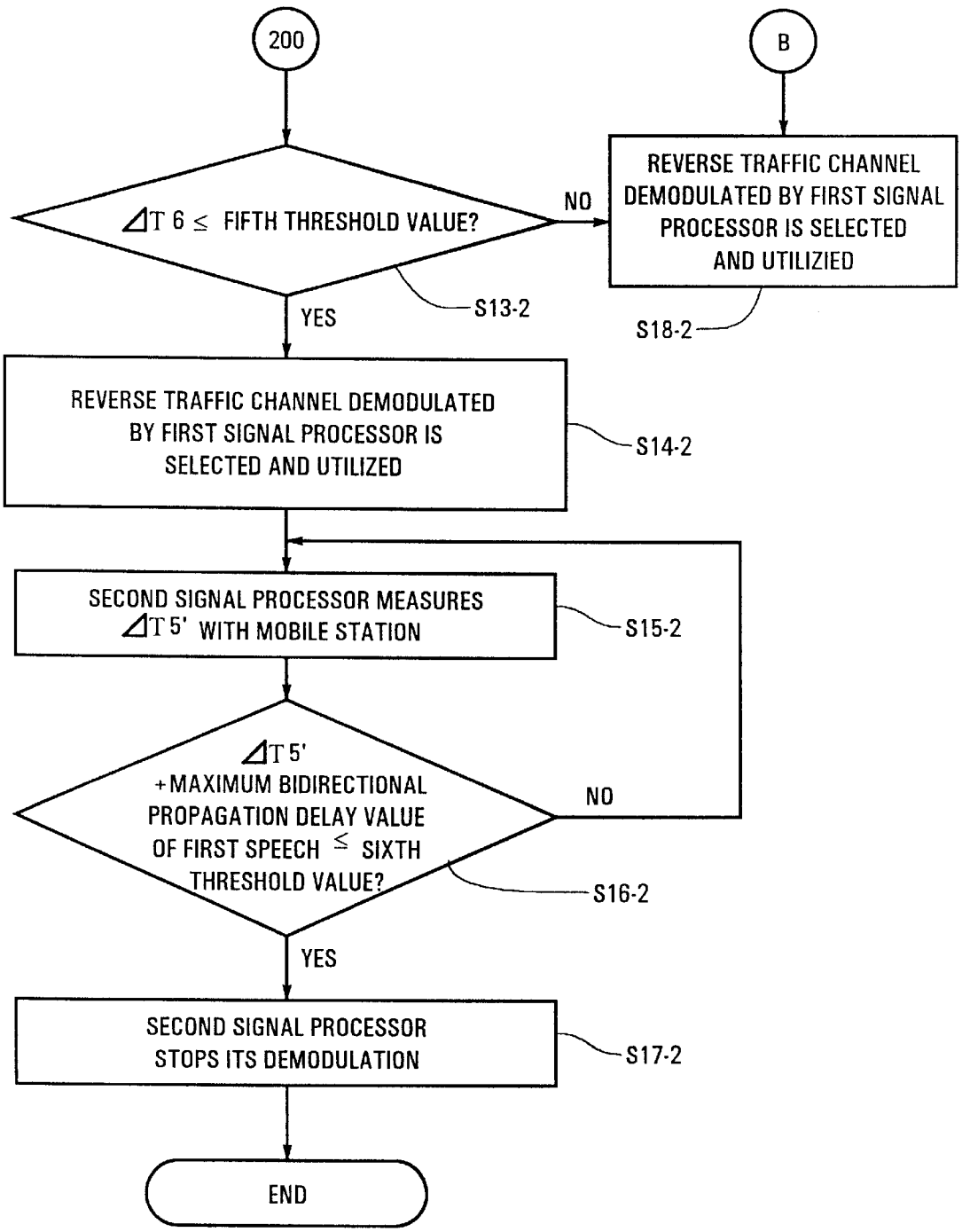

FIGS. 7a and 7b are flowcharts illustrating a method for operating the base station to solve a speech disable state based on the movement of a specific mobile station located in the second speech sphere 120 to the first speech sphere 110 in accordance with the first embodiment of the present invention.

With reference to FIGS. 7a and 7b, first, the clock generator 200 generates the first EVEN SECOND clock and the second EVEN SECOND clock, which is delayed from the first EVEN SECOND clock by the maximum bidirectional propagation delay value of the first speech sphere 110, at step S1-2. At step S2-2, the first and second signal processors 300 and 310 receive the first and second EVEN SECOND clocks from the clock generator 200, respectively.

The first signal processor 300 assigns pilot, synchronization and paging channels synchronously with the first EVEN SECOND clock and transmits them to all speech spheres covered by the base station at step S3-2. If an access channel is sent from the specific mobile station located in the second speech sphere 120 at step S4-2, then it is detected and demodulated by the second signal processor 310 synchronously with the second EVEN SECOND clock at step S5-2.

Thereafter, the first signal processor 300 assigns a traffic channel synchronously with the second EVEN SECOND clock and transmits it to the specific mobile station in the second speech sphere 120 at step S6-2. If a reverse traffic channel is sent from the specific mobile station in the second speech sphere 120 at step S7-2, then it is detected and demodulated by the second signal processor 310 synchronously with the second EVEN SECOND clock at step S8-2.

The second signal processor 310 measures a bidirectional propagation delay time $\Delta T5$ with the specific mobile station at an interval of predetermined time at step S9-2. Then, the second signal processor 310 adds the maximum bidirectional propagation delay value of the first speech sphere 110 to the measured value ΔT5 and sets the added result as a new bidirectional propagation delay time ΔT6 at step S10-2.

Subsequently, the second signal processor 310 compares the bidirectional propagation delay time ΔT6 with a fourth threshold value (greater than the second threshold value and smaller than the third threshold value) at step S11-2.

If the bidirectional propagation delay time ΔT6 is greater than the fourth threshold value, or NO at the above step S11-2, the operation returns to the above step S9-2. To the contrary, in the case where the bidirectional propagation delay time ΔT6 is smaller than or equal to the fourth threshold value, or YES at the above step S11-2, the first signal processor 300 detects and demodulates the reverse traffic channel from the specific mobile station synchronously with the bidirectional propagation delay time ΔT6 at step S12-2.

Then, the second signal processor 310 compares the bidirectional propagation delay time ΔT6 with a fifth threshold value (greater than the first threshold value and smaller than the second threshold value) at step S13-2.

If the bidirectional propagation delay time ΔT6 is smaller than or equal to the fifth threshold value, or YES at the above step S13-2, the reverse traffic channel demodulated by the first signal processor 300 is selected and utilized at step S14-2. Thereafter, the second signal processor 310 measures a bidirectional propagation delay time ΔT5' with the specific mobile station at step S15-2, adds the maximum bidirectional propagation delay value of the first speech sphere 110 to the measured value ΔT5' and compares the added result with a sixth threshold value (greater than the maximum bidirectional propagation delay value of the first speech sphere and smaller than the first threshold value) at step S16-2.

In the case where the added result is greater than the sixth threshold value, or NO at the above step S16-2, the operation returns to the above step S15-2. To the contrary, if the added result is smaller than or equal to the sixth threshold value, or YES at the above step S16-2, the second signal processor 310 stops its demodulation at step S17-2 and the operation is then ended.

On the other hand, if the bidirectional propagation delay time ΔT6 is greater than the fifth threshold value, or NO at the above step S13-2, the reverse traffic channel demodulated by the second signal processor 310 is selected and utilized at step S18-2 and the operation then returns to the above step S9-2.

Figure 8A:
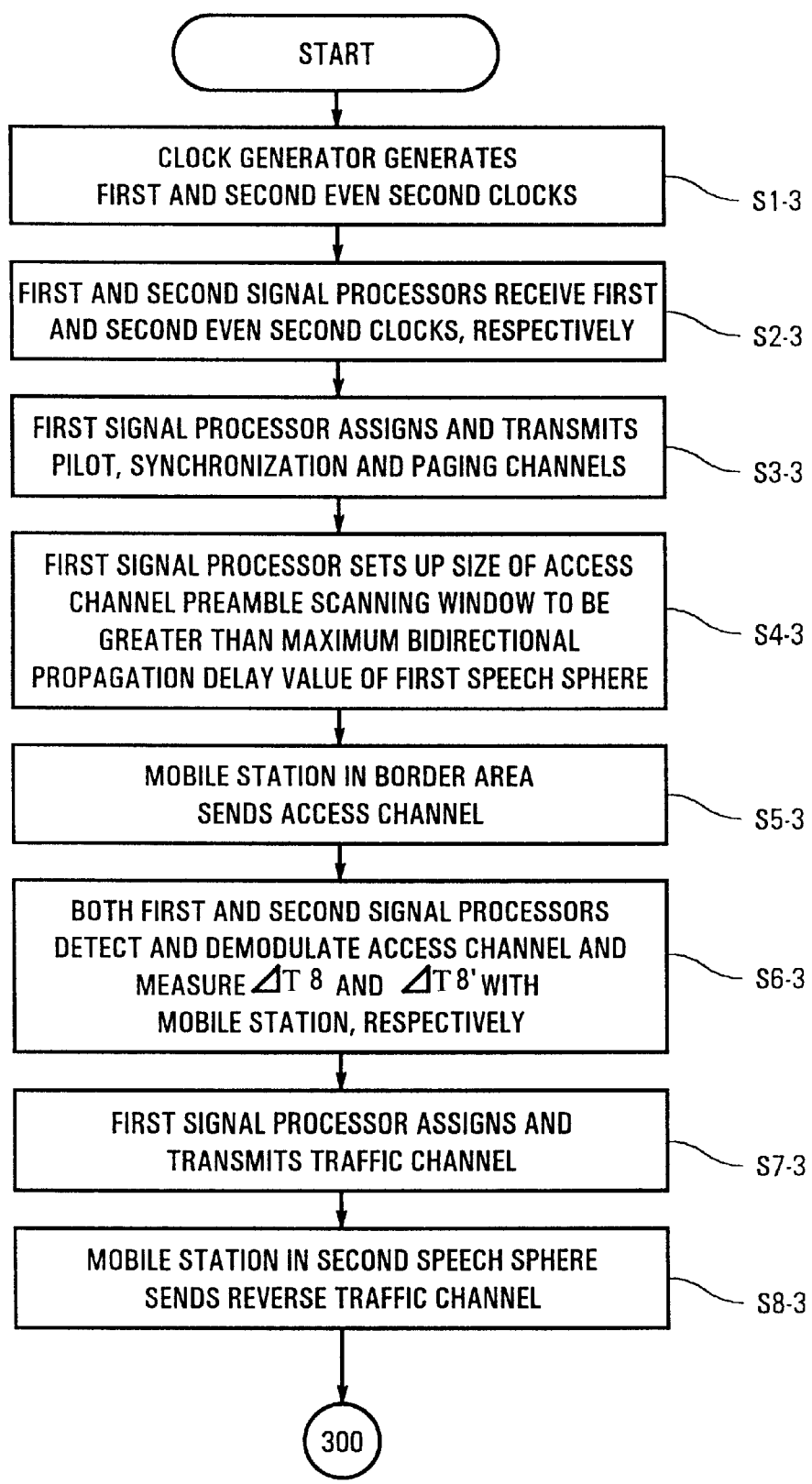
FIGS. 8a and 8b are flowcharts illustrating a method for operating the base station to solve a speech disable state based on the location of a mobile station in a border area between the first and second speech spheres in accordance with the first embodiment of the present invention.
Figure 8B:
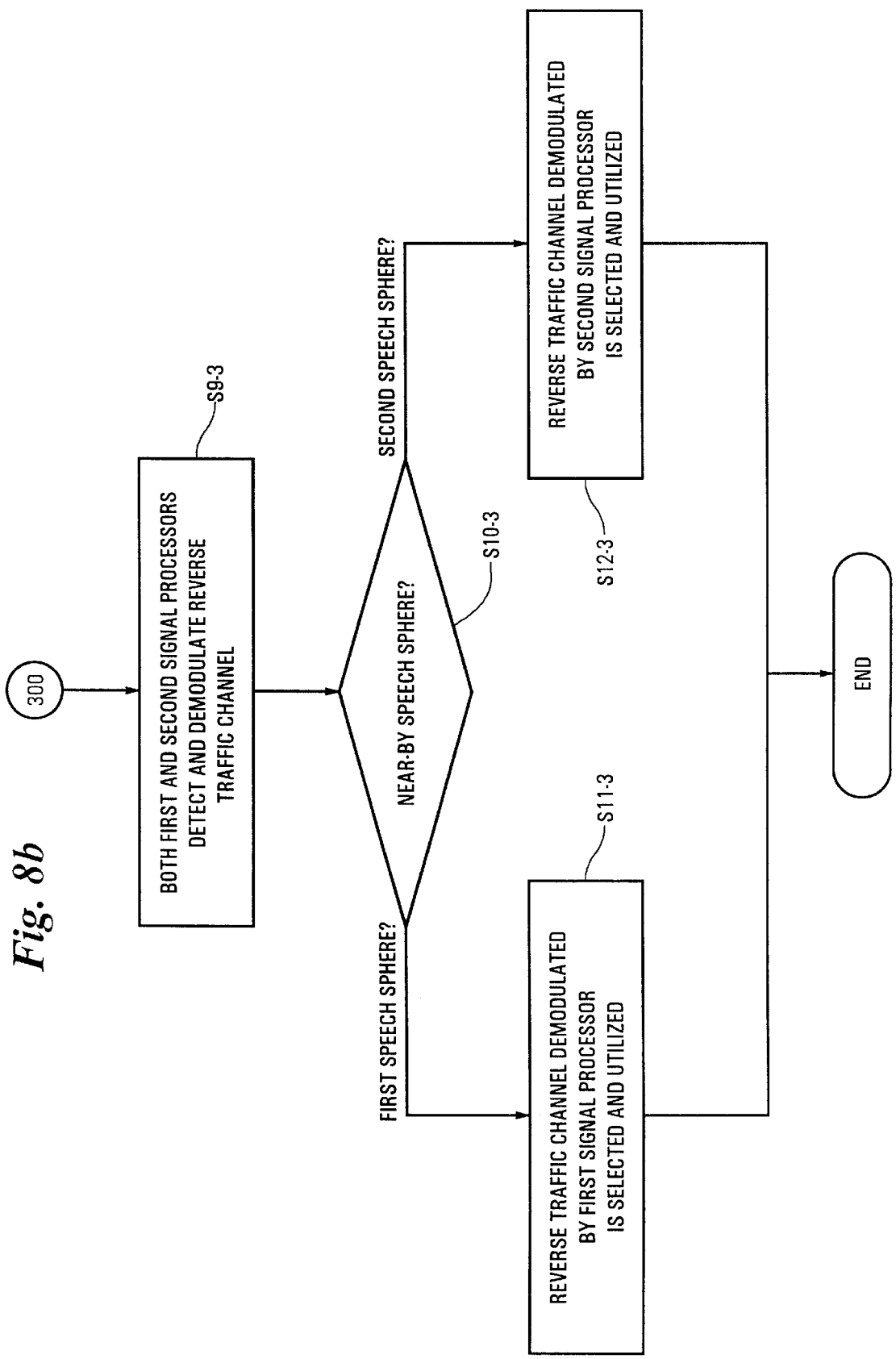

FIGS. 8a and 8b are flowcharts illustrating a method for operating the base station to solve a speech disable state based on the location of a specific mobile station in a border area between the first and second speech spheres 110 and 120 in accordance with the first embodiment of the present invention.

With reference to FIGS. 8a and 8b, first, the clock generator 200 generates the first EVEN SECOND clock and the second EVEN SECOND clock, which is delayed from the first EVEN SECOND clock by the maximum bidirectional propagation delay value of the first speech sphere 110, at step S1-3. Then, the first and second signal processors 300 and 310 receive the first and second EVEN SECOND clocks from the clock generator 200, respectively, at step S2-3.

The first signal processor 300 assigns pilot, synchronization and paging channels synchronously with the first EVEN SECOND clock and transmits them to all speech spheres covered by the base station at step S3-3. Further, the first signal processor 300 sets up the size of an access channel preamble scanning window to be greater than the maximum bidirectional propagation delay value of the first speech sphere 110 at step S4-3.

If an access channel is sent from the specific mobile station in the border area at step S5-3, then it is detected and demodulated by both of the first and second signal processors 300 and 310 synchronously, respectively, with the first and second EVEN SECOND clocks at step S6-3. Further, the first and second signal processors 300 and 310 measure bidirectional propagation delay times ΔT8 and ΔT8' with the specific mobile station, respectively.

Subsequently, the first signal processor 300 assigns a traffic channel synchronously with the first EVEN SECOND clock and transmits it to the specific mobile station at step S7-3. If a reverse traffic channel is sent from the specific mobile station at step S8-3, then it is detected and demodulated by both of the first and second signal processors 300 and 310 synchronously, respectively, with the first and second EVEN SECOND clocks at step S9-3.

Thereafter, the bidirectional propagation delay times ΔT8 and ΔT8' measured at the above step S6-3 are compared with each other at step S10-3 to determine which one of the first and second speech spheres 110 and 120 is a near-by speech sphere.

If the first speech sphere 110 is determined to be the near-by speech sphere at the above step S10-3, the reverse traffic channel demodulated by the first signal processor 300 at the above step S9-3 is selected and utilized at step S11-3 and the operation is then ended. However, in the case where the second speech sphere 120 is determined to be the near-by speech sphere at the above step S10-3, the reverse traffic channel demodulated by the second signal processor 310 at the above step S9-3 is selected and utilized at step S12-3 and the operation is then ended.

Figure 9A:
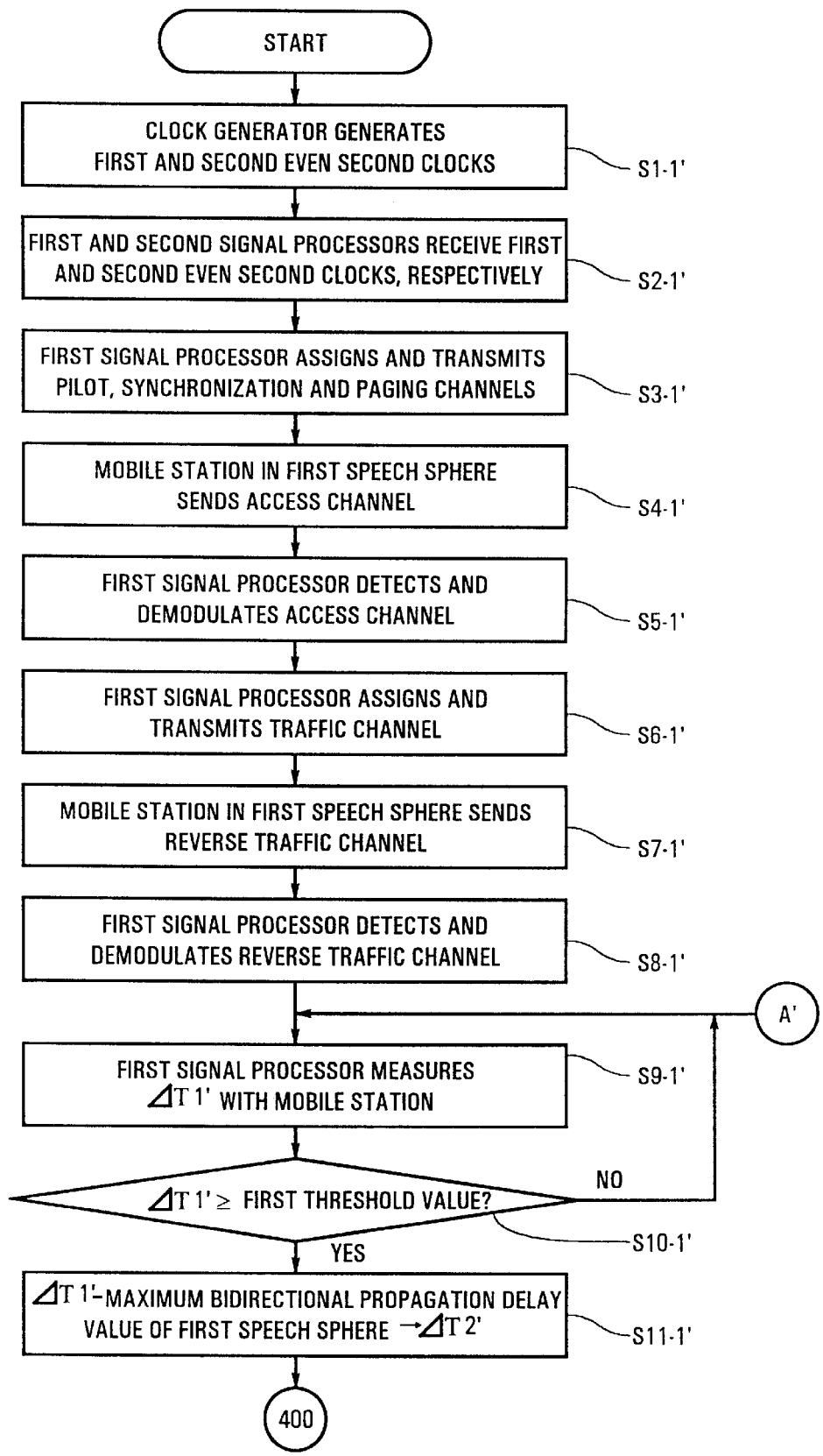
FIGS. 9a and 9b are flowcharts illustrating a method for operating a base station to solve a speech disable state based on the movement of a mobile station from a first speech sphere to a second speech sphere in accordance with a second embodiment of the present invention.
Figure 9B:
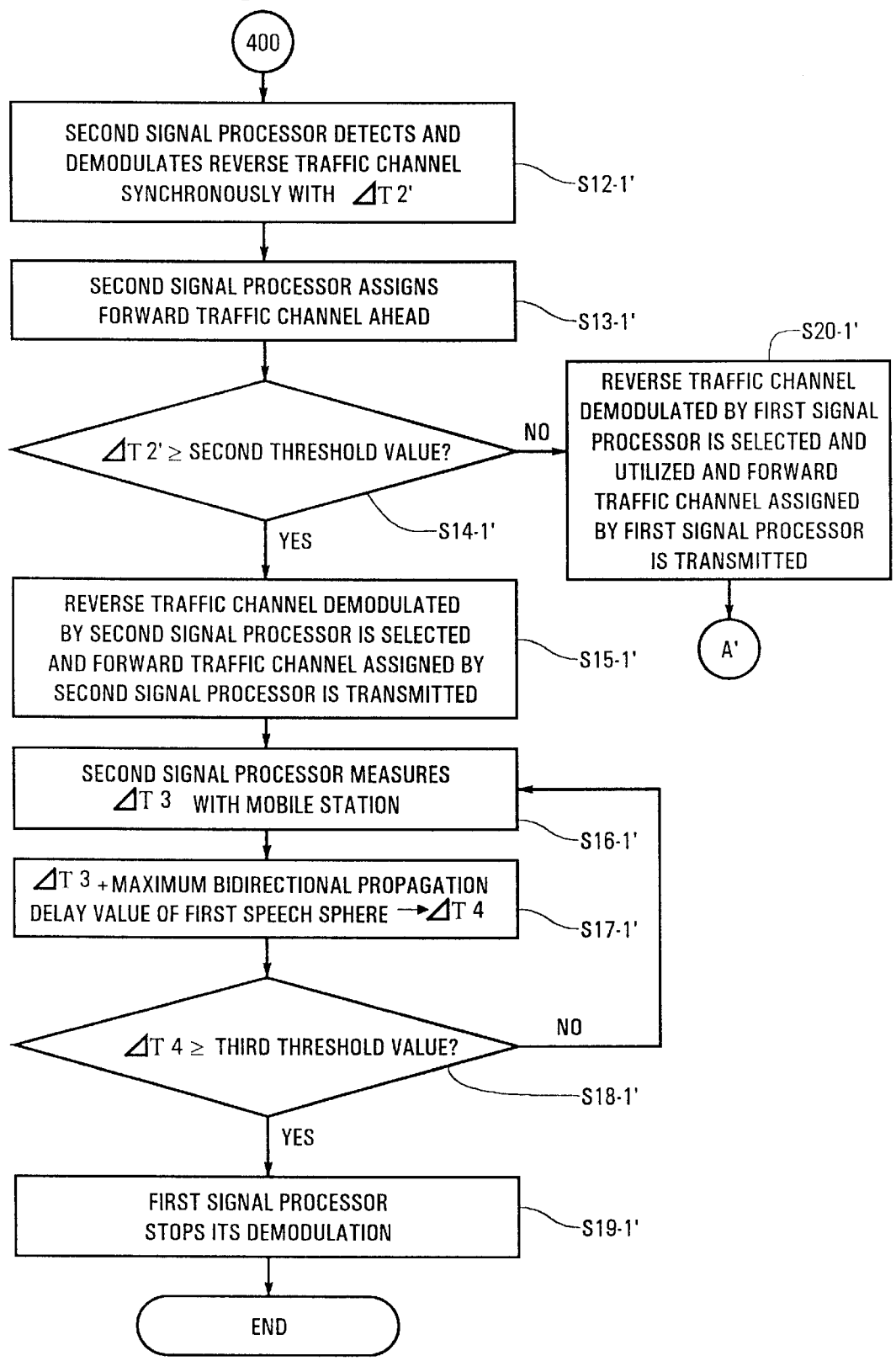

FIGS. 9a and 9b are flowcharts illustrating a method for operating a base station to solve a speech disable state based on the movement of a specific mobile station located in the first speech sphere 110 to the second speech sphere 120 in accordance with a second embodiment of the present invention.

Figure 4:
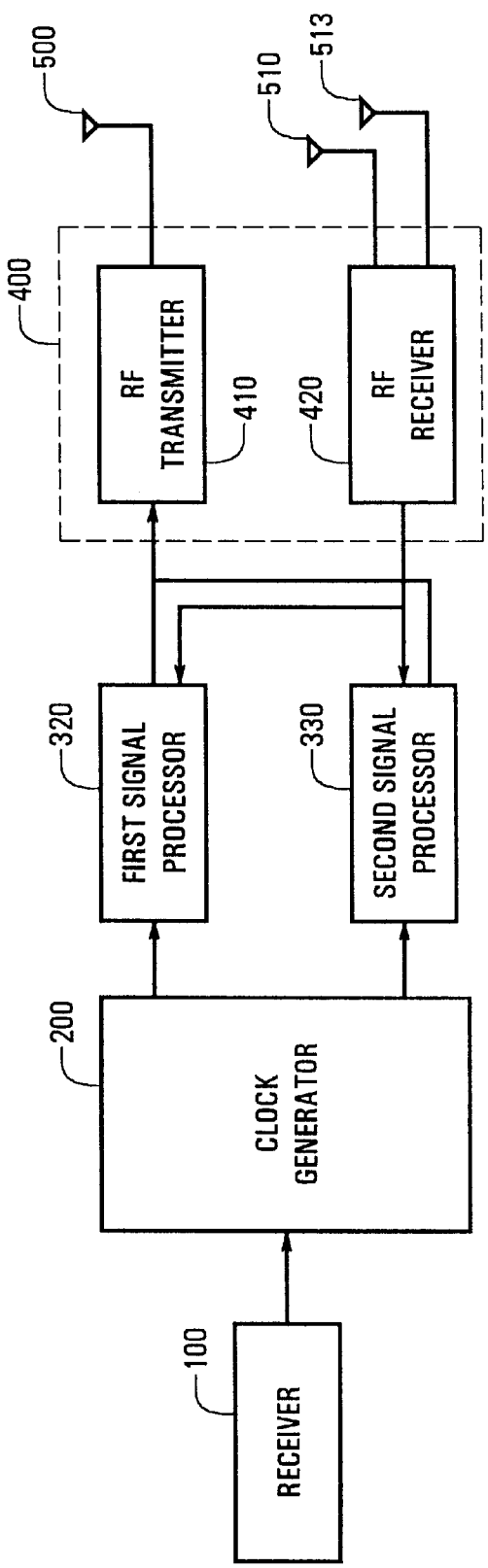
FIG. 4 is a block diagram of another example of a base station for speech radius enlargement in a CDMA mobile communication system.
Figure 5:
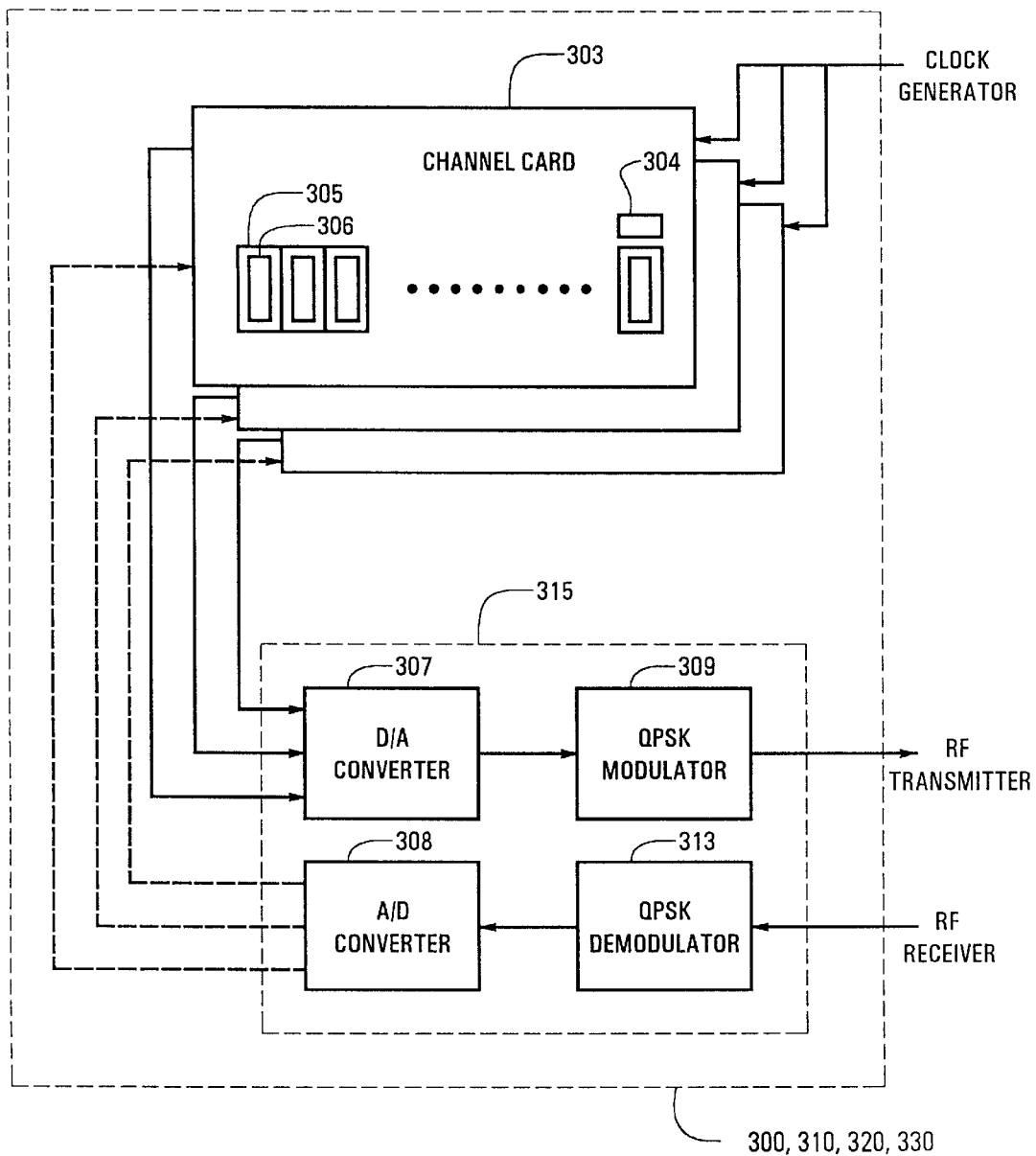
FIG. 5 is a detailed block diagram of signal processors in FIGS. 1 and 4.

The base station applied to the second embodiment of the present invention is the same in construction as that of FIG. 4 and a detailed description thereof will thus be omitted.

With reference to FIGS. 9a and 9b, first, at step S1-1', the clock generator 200 generates the first EVEN SECOND clock and the second, EVEN SECOND clock, which is delayed from the first EVEN SECOND clock by the maximum bidirectional propagation delay value of the first speech sphere 110. Then, the first and second signal processors 320 and 330 receive the first and second EVEN SECOND clocks from the clock generator 200, respectively, at step S2-1'.

The first signal processor 320 assigns pilot, synchronization and paging channels synchronously with the first EVEN SECOND clock and transmits them to all speech spheres covered by the base station at step S3-1'. If an access channel is sent from the specific mobile station located in the first speech sphere 110 at step S4-1', then it is detected and demodulated by the first signal processor 320 synchronously with the first EVEN SECOND clock at step S5-1'.

Further, the first signal processor 320 assigns a forward traffic channel synchronously with the first EVEN SECOND clock and transmits it to the specific mobile station in the first speech sphere 110 at step S6-1'. If a reverse traffic channel is sent from the specific mobile station in the first speech sphere 110 at step S7-1', then it is detected and demodulated by the first signal processor 320 synchronously with the first EVEN SECOND clock at step S8-1'.

Then, the first signal processor 320 measures a bidirectional propagation delay time ΔT1" with the specific mobile station at an interval of predetermined time at step S9-1' and compares the measured value ΔT1" with a first threshold value at step S10-1'.

If the measured value ΔT1" is smaller than the first threshold value, or NO at the above step S10-1', the operation returns to the above step S9-1'. To the contrary, in the case where the measured value ΔT1" is greater than or equal to the first threshold value, or YES at the above step S10-1', the first signal processor 320 subtracts the maximum bidirectional propagation delay value of the first speech sphere 110 from the measured value ΔT1" and sets the subtracted result as a new bidirectional propagation delay time ΔT2' at step S11-1'.

Subsequently, the second signal processor 330 detects and demodulates the reverse traffic channel from the specific mobile station synchronously with the bidirectional propagation delay time ΔT2' at step S12-1' and assigns a forward traffic channel ahead at step S13-1'. Then, the second signal processor 330 compares the bidirectional propagation delay time ΔT2' with a second threshold value at step S14-1'.

If the bidirectional propagation delay time ΔT2' is greater than or equal to the second threshold value, or YES at the above step S14-1', the reverse traffic channel demodulated by the second signal processor 330 is selected and utilized at step S15-1'. Further, the forward traffic channel assigned by the second signal processor 330 is transmitted to the specific mobile station.

Thereafter, the second signal processor 330 measures a bidirectional propagation delay time ΔT3 with the specific mobile station at step S16-1', adds the maximum bidirectional propagation delay value of the first speech sphere 110 to the measured value ΔT3 and sets the added result as a new bidirectional propagation delay time ΔT4 at step S17-1'.

The second signal processor 330 then compares the bidirectional propagation delay time ΔT4 with a third threshold value at step S18-1'. If the bidirectional propagation delay time ΔT4 is smaller than the third threshold value, or NO at the above step S18-1', the operation returns to the above step S16-1'. To the contrary, in the case where the bidirectional propagation delay time ΔT4 is greater than or equal to the third threshold value, or YES at the above step S18-1', the first signal processor 320 stops its demodulation at step S19-1' and the operation is then ended.

On the other hand, if the bidirectional propagation delay time ΔT2' is smaller than the second threshold value, or NO at the above step S14-1', the reverse traffic channel demodulated by the first signal processor 320 is selected and utilized at step S20-1'. Further, the forward traffic channel assigned by the first signal processor 320 is transmitted to the specific mobile station and the operation then returns to the above step S9-1'.

Figure 10B:
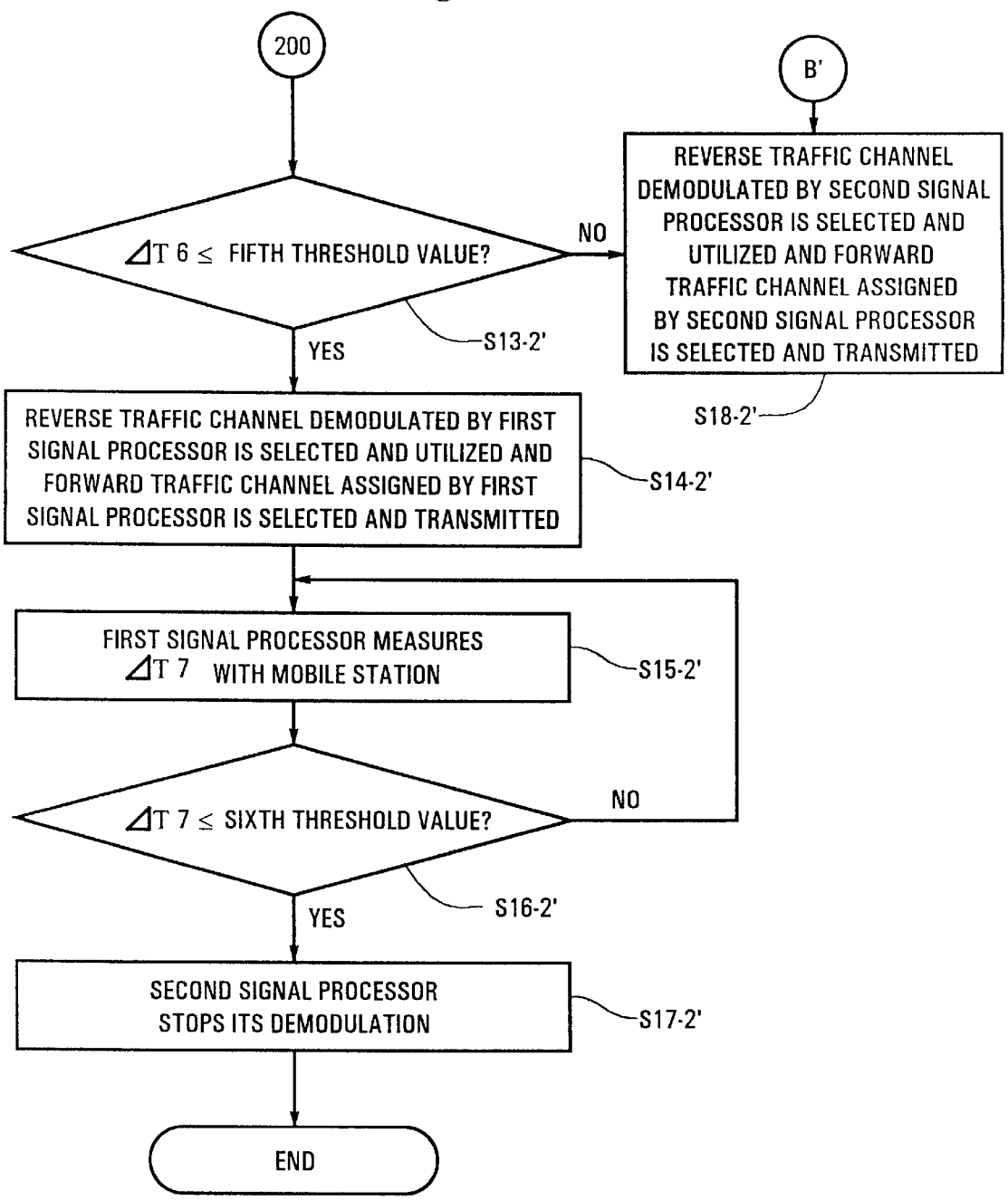

FIGS. 10a and 10b are flowcharts illustrating a method for operating the base station to solve a speech disable state based on the movement of a specific mobile station located in the second speech sphere 120 to the first speech sphere 110 in accordance with the second embodiment of the present invention.

With reference to FIGS. 10a and 10b, first, the clock generator 200 generates the first EVEN SECOND clock and the second EVEN SECOND clock, which is delayed from the first EVEN SECOND clock by the maximum bidirectional propagation delay value of the first speech sphere 110, at step S1-2'. At step S2-2', the first and second signal processors 320 and 330 receive the first and second EVEN SECOND clocks from the clock generator 200, respectively.

The first signal processor 320 assigns pilot, synchronization and paging channels synchronously with the first EVEN SECOND clock and transmits them to all speech spheres covered by the base station at step S3-2'. If an access channel is sent from the specific mobile station located in the second speech sphere 120 at step S4-2', then it is detected and demodulated by the second signal processor 330 synchronously with the second EVEN SECOND clock at step S5-2'.

Thereafter, the second signal processor 320 assigns a forward traffic channel ahead and transmits it to the specific mobile station in the second speech sphere 120 at step S6-2'.

If a reverse traffic channel is sent from the specific mobile station in the second speech sphere 120 at step S7-2', then it is detected and demodulated by the second signal processor 330 synchronously with the second EVEN SECOND clock at step S8-'2'.

Then, the second signal processor 330 measures a bidirectional propagation delay time ΔT5 with the specific mobile station at an interval of predetermined time at step S9-2', adds the maximum bidirectional propagation delay value of the first speech sphere 110 to the measured value ΔT5 and sets the added result as a new bidirectional propagation delay time ΔT6 at step S10-2'. Subsequently, the second signal processor 330 compares the bidirectional propagation delay time ΔT6 with a fourth threshold value at step S11-2'.

If the bidirectional propagation delay time ΔT6 is greater than the fourth threshold value, or NO at the above step S11-2', the operation returns to the above step S9-2'. To the contrary, in the case where the bidirectional propagation delay time ΔT6 is smaller than or equal to the fourth threshold value, or YES at the above step S11-2', the first signal processor 320 detects and demodulates the reverse traffic channel from the specific mobile station synchronously with the bidirectional propagation delay time ΔT6 at step S12-2'. Further, the first signal processor 320 assigns a forward traffic channel.

Then, the second signal processor 330 compares the bidirectional propagation delay time ΔT6 with a fifth threshold value at step S13-2'. If the bidirectional propagation delay time ΔT6 is smaller than or equal to the fifth threshold value, or YES at the above step S13-2', the reverse traffic channel demodulated by the first signal processor 320 is selected and utilized at step S14-2'. Further, the forward traffic channel assigned by the first signal processor 320 is selected and transmitted to the specific mobile station.

Thereafter, the first signal processor 320 measures a bidirectional propagation delay time ΔT7 with the specific mobile station at step S15-2' and compares the measured value ΔT7 with a sixth threshold value at step S16-2'.

In the case where the measured value ΔT7 is greater than the sixth threshold value, or NO at the above step S16-2', the operation returns to the above step S15-2'. To the contrary, if the measured value ΔT7 is smaller than or equal to the sixth threshold value, or YES at the above step S16-2', the second signal processor 330 stops its demodulation at step S17-2' and the operation is then ended.

On the other hand, if the bidirectional propagation delay time ΔT6 is greater than the fifth threshold value, or NO at the above step S13-2', the reverse traffic channel demodulated by the second signal processor 330 is selected and utilized at step S18-2'. Further, the forward traffic channel assigned by the second signal processor 330 is selected and transmitted to the specific mobile station and the operation then returns to the above step S9-2'.

FIGS. 11a and 11b are flowcharts illustrating a method for operating the base station to solve a speech disable state based on the location of a specific mobile station in a border area between the first and second speech spheres 110 and 120 in accordance with the second embodiment of the present invention.

With reference to FIGS. 11a and 11b, first, the clock generator 200 generates the first EVEN SECOND clock and the second EVEN SECOND clock, which is delayed from the first EVEN SECOND clock by the maximum bidirectional propagation delay value of the first speech sphere 110, at step S1-3'. At step S2-3', the first and second signal processors 320 and 330 receive the first and second EVEN SECOND clocks from the clock generator 200, respectively.

Then, the first signal processor 320 assigns pilot, synchronization and paging channels synchronously with the first EVEN SECOND clock and transmits them to all speech spheres covered by the base station at step S3-3'. Further, the first signal processor 320 sets up the size of an access channel preamble scanning window to be greater than the maximum bidirectional propagation delay value of the first speech sphere 110 at step S4-3'.

If an access channel is sent from the specific mobile station in the border area at step S5-3', then it is detected and demodulated by both of the first and second signal processors 320 and 330 synchronously, respectively, with the first and second EVEN SECOND clocks at step S6-3'. Further, the first and second signal processors 320 and 330 measure bidirectional propagation delay times ΔT9 and ΔT9' with the specific mobile station, respectively.

Thereafter, both of the first and second signal processors 320 and 330 assign forward traffic channels and transmit them to the specific mobile station at step S7-3'.

If a reverse traffic channel is sent from the specific mobile station at step S8-3', then it is detected and demodulated by both of the first and second signal processors 320 and 330 synchronously, respectively, with the first and second EVEN SECOND clocks at step S9-3'.

Subsequently, the measured bidirectional propagation delay times ΔT9 and ΔT9' are compared with each other at step S10-3' to determine which one of the first and second speech spheres 110 and 120 is a near-by speech sphere.

If the first speech sphere 110 is determined to be the near-by speech sphere at the above step S10-3', the reverse traffic channel demodulated by the first signal processor 320 at the above step S9-3' is selected and utilized at step S11-3'. Further, the forward traffic channel assigned by the first signal processor 320 is transmitted to the specific mobile station and the operation is then ended.

On the other hand, in the case where the second speech sphere 120 is determined to be the near-by speech sphere at the above step S10-3', the reverse traffic channel demodulated by the second signal processor 330 is selected and utilized at step S12-3'. Further, the forward traffic channel assigned by the second signal processor 330 is transmitted to the specific mobile station and the operation is then ended.

As apparent from the above description, the present invention provides a method for operating a base station to solve a speech disable state based on the inter-speech sphere movement of a mobile station in enlarging a speech radius limited in timing in a CDMA mobile communication system. According to the present invention, in a base station where a speech radius wider than that limited by a modem ASIC is partitioned by a predetermined radius unit into a plurality of speech spheres for the enlargement of the limited speech radius and channel elements are assigned to the partitioned speech spheres for transmission/reception of channels, a handoff operation is performed from an arbitrary channel element in the base station to a channel element assigned to a different speech sphere when a mobile station moves beyond an initial speech sphere during conversation with the arbitrary channel element. At this time, a reverse traffic channel is demodulated and remains at a standby state. Therefore, if the mobile station moves beyond the initial speech sphere above the predetermined radius unit, the demodulated reverse traffic channel is selected and utilized by the channel element assigned to the different speech sphere. This has the effect of preventing a speech disable state based on the inter-speech sphere movement of the mobile station.

Further, when a mobile station is located in a border area between two adjacent speech spheres, channel elements are initially assigned to the two speech spheres, respectively, to transmit and receive channels. It is then determined on the basis of a predetermined threshold value which one of the two speech spheres is a near-by speech sphere, and the channel element assigned to the near-by speech sphere selects and utilizes transmission/reception channels, thereby preventing any speech disable state.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. In a method for operating a CDMA base station which partition a speech radius wider than that limited in timing by a modem ASIC of said base station into first and second speech spheres by a predetermined unit below the maximum speech radius allowed by said base station modem ASIC to enlarge the limited speech radius, said base station having a first signal processor for processing forward link channels from said base station to mobile stations in said first and second speech spheres and reverse link channels from said mobile stations in said first speech sphere to said base station and a second signal processor for processing reverse link channels from said mobile stations in said second speech sphere to said base station, a method for solving a speech disable state based on the movement of a specific mobile station located in said first speech sphere to said second speech sphere, comprising the steps of:

a) allowing a clock generator to generate first and second EVEN SECOND clocks, said second EVEN SECOND clock being delayed from said first EVEN SECOND clock by the maximum bidirectional propagation delay value of said first speech sphere, and allowing said first and second signal processors to receive said first and second EVEN SECOND clocks from said clock generator, respectively;

b) allowing said first signal processor to assign pilot, synchronization and paging channels synchronously with said first EVEN SECOND clock and transmit them to all speech spheres covered by said base station;

c) if an access channel is sent from said specific mobile station located in said first speech sphere, allowing said first signal processor to detect and demodulate said access channel synchronously with said first EVEN SECOND clock;

d) allowing said first signal processor to assign a traffic channel synchronously with said first EVEN SECOND clock and transmit it to said specific mobile station in said first speech sphere;

e) if a reverse traffic channel is sent from said specific mobile station in said first speech sphere, allowing said first signal processor to detect and demodulate said reverse traffic channel synchronously with said first EVEN SECOND clock;

f) allowing said first signal processor to measure a first bidirectional propagation delay time with said specific mobile station at an interval of predetermined time and compare the measured first bidirectional propagation delay time with a first threshold value;

g) allowing said first signal processor to repeatedly measure said first bidirectional propagation delay time if said first bidirectional propagation delay time is smaller than said first threshold value at said step f) and, if said first bidirectional propagation delay time is greater than or equal to said first threshold value at said step f), allowing said first signal processor to subtract said maximum bidirectional propagation delay value of said first speech sphere from said first bidirectional propagation delay time and set the subtracted result as a second bidirectional propagation delay time;

h) allowing said second signal processor to detect and demodulate said reverse traffic channel from said specific mobile station synchronously with said second bidirectional propagation delay time;

i) allowing said first signal processor to compare said first bidirectional propagation delay time with a second threshold value; and j) selecting and utilizing said reverse traffic channel demodulated by said second signal processor if said first bidirectional propagation delay time is greater than or equal to said second threshold value at said step i).

2. The speech disable state solving method as set forth in claim 1, further comprising the steps of:

k) allowing said first signal processor to measure a third bidirectional propagation delay time with said specific mobile station;

l) allowing said first signal processor to compare said third bidirectional propagation delay time measured at said step k) with a third threshold value; and m) returning to said step k) if said third bidirectional propagation delay time is smaller than said third threshold value at said step l) and stopping the demodulation operation of said first signal processor if said third bidirectional propagation delay time is greater than or equal to said third threshold value at said step l).

3. The speech disable state solving method as set forth in claim 1, further comprising the step of k), if said first bidirectional propagation delay time is smaller than said second threshold value at said step i), selecting and utilizing said reverse traffic channel demodulated by said first signal processor and then returning to said step f).

4. The speech disable state solving method as set forth in claim 1, wherein said first to third threshold values are defined as follows:

maximum bidirectional propagation delay value of first speech sphere<first threshold value<second threshold value<third threshold value<maximum bidirectional propagation delay value limited by modem ASIC.

5. In a method for operating a CDMA base station which partitions a speech radius wider than that limited in timing by a modem ASIC of said base station into first and second speech spheres by a predetermined unit below the maximum speech radius allowed by said base station modem ASIC to enlarge the limited speech radius, said base station having a first signal processor for processing forward link channels from said base station to mobile stations in said first and second speech spheres and reverse link channels from said mobile stations in said first speech sphere to said base station and a second signal processor for processing reverse link channels from said mobile stations in said second speech sphere to said base station, a method for solving a speech disable state based on the movement of a specific mobile station located in said second speech sphere to said first speech sphere, comprising the steps of:

a) allowing a clock generator to generate first and second EVEN SECOND clocks, said second EVEN SECOND clock being delayed from said first EVEN SECOND clock by the maximum bidirectional propagation delay value of said first speech sphere, and allowing said first and second signal processors to receive said first and second EVEN SECOND clocks from said clock generator, respectively;

b) allowing said first signal processor to assign pilot, synchronization and paging channels synchronously with said first EVEN SECOND clock and transmit them to all speech spheres covered by said base station;

c) if an access channel is sent from said specific mobile station located in said-second speech sphere, allowing said second signal processor to detect and demodulate said access channel synchronously with said second EVEN SECOND clock;

d) allowing said first signal processor to assign a traffic channel synchronously with said second EVEN SECOND clock and transmit it to said specific mobile station in said second speech sphere;

e) if a reverse traffic channel is sent from said specific mobile station in said second speech sphere, allowing said second signal processor to detect and demodulate said reverse traffic channel synchronously with said second EVEN SECOND clock;

f) allowing said second signal processor to measure a first bidirectional propagation delay time with said specific mobile station at an interval of predetermined time, add said maximum bidirectional propagation delay value of said first speech sphere to the measured first bidirectional propagation delay time and set the added result as a second bidirectional propagation delay time;

g) allowing said second signal processor to compare said second bidirectional propagation delay time with a first threshold value;

h) returning to said f) if said second bidirectional propagation delay time is greater than said first threshold value at said step g) and allowing said first signal processor to detect and demodulate said reverse traffic channel from said specific mobile station synchronously with said second bidirectional propagation delay time if said second bidirectional propagation delay time is smaller than or equal to said first threshold value at said step g);

i) allowing said second signal processor to compare said second bidirectional propagation delay time with a second threshold value; and j) selecting and utilizing said reverse traffic channel demodulated by said first signal processor if said second bidirectional propagation delay time is smaller than or equal to said second threshold value at said step i).

6. The speech disable state solving method as set forth in claim 5, further comprising the steps of:

k) allowing said second signal processor to measure a third bidirectional propagation delay time with said specific mobile station, add said maximum bidirectional propagation delay value of said first speech sphere to the measured third bidirectional propagation delay time and compare the added result with a third threshold value; and l) allowing said second signal processor to repeatedly measure said third bidirectional propagation delay time if said third bidirectional propagation delay time is greater than said third threshold value at said step k) and stopping the demodulation operation of said second signal processor if said third bidirectional propagation delay time is smaller than or equal to said third threshold value at said step k).

7. The speech disable state solving method as set forth in claim 5, further comprising the step of k), if said second bidirectional propagation delay time is greater than said second threshold value at said step i), selecting and utilizing said reverse traffic channel demodulated by said second signal processor and then returning to said step f).

8. The speech disable state solving method as set forth in claim 5, wherein said first to third threshold values are defined as follows:

first threshold value>second threshold value>third threshold value>maximum bidirectional propagation delay value of first speech sphere.

9. In a method for operating a CDMA base station which partitions a speech radius wider than that limited in timing by a modem ASIC of said base station into first and second speech spheres by a predetermined unit below the maximum speech radius allowed by said base station modem ASIC to enlarge the limited speech radius, said base station having a first signal processor for processing forward link channels from said base station to mobile stations in said first and second speech spheres and reverse link channels from said mobile stations in said first speech sphere to said base station and a second signal processor for processing reverse link channels from said mobile stations in said second speech sphere to said base station, a method for solving a speech disable state based on the location of a specific mobile station in a border area between said first and second speech spheres, comprising the steps of:

a) allowing a clock generator to generate first and second EVEN SECOND clocks, said second EVEN SECOND clock being delayed from said first EVEN SECOND clock by the maximum bidirectional propagation delay value of said first speech sphere, and allowing said first and second signal processors to receive said first and second EVEN SECOND clocks from said clock generator, respectively;

b) allowing said first signal processor to assign pilot, synchronization and paging channels synchronously with said first EVEN SECOND clock and transmit them to all speech spheres covered by said base station;

c) allowing said first signal processor to set up the size of an access channel preamble scanning window to be greater than said maximum bidirectional propagation delay value of said first speech sphere;

d) if an access channel is sent from said specific mobile station in said border area, allowing both of said first and second signal processors to detect and demodulate said access channel synchronously, respectively, with said first and second EVEN SECOND clocks and measure first and second bidirectional propagation delay times with said specific mobile station, respectively;

e) allowing said first signal processor to assign a traffic channel synchronously with said first EVEN SECOND clock and transmit it to said specific mobile station;

f) if a reverse traffic channel is sent from said specific mobile station, allowing both of said first and second signal processors to detect and demodulate said reverse traffic channel synchronously, respectively, with said first and second EVEN SECOND clocks;

g) comparing said first and second bidirectional propagation delay times measured at said step d) with each other to determine which one of said first and second speech spheres is a near-by speech sphere; and h) selecting and utilizing said reverse traffic channel demodulated by said first signal processor if said first speech sphere is determined to be the near-by speech sphere at said step g) and selecting and utilizing said reverse traffic channel demodulated by said second signal processor if said second speech sphere is determined to be the near-by speech sphere at said step g).

10. In a method for operating a CDMA base station which partitions a speech radius wider than that limited in timing by a modem ASIC of said base station into first and second speech spheres by a predetermined unit below the maximum speech radius allowed by said base station modem ASIC to enlarge the limited speech radius, said base station having a first signal processor for processing forward link channels from said base station to mobile stations in said first and second speech spheres and reverse link channels from said mobile stations in said first speech sphere to said base station and a second signal processor for processing reverse link channels from said mobile stations in said second speech sphere to said base station, a method for solving a speech disable state based on the movement of a specific mobile station located in said first speech sphere to said second speech sphere, comprising the steps of:

a) allowing a clock generator to generate first and second EVEN SECOND clocks, said second EVEN SECOND clock being delayed from said first EVEN SECOND clock by the maximum bidirectional propagation delay value of said first speech sphere, and allowing said first and second signal processors to receive said first and second EVEN SECOND clocks from said clock generator, respectively;

b) allowing said first signal processor to assign pilot, synchronization and paging channels synchronously with said first EVEN SECOND clock and transmit them to all speech spheres covered by said base station;

c) if an access channel is sent from said specific mobile station located in said first speech sphere, allowing said first signal processor to detect and demodulate said access channel synchronously with said first EVEN SECOND clock;

d) allowing said first signal processor to assign a forward traffic channel synchronously with said first EVEN SECOND clock and transmit it to said specific mobile station in said first speech sphere;

e) if a reverse traffic channel is sent from said specific mobile station in said first speech sphere, allowing said first signal processor to detect and demodulate said reverse traffic channel synchronously with said first EVEN SECOND clock;

f) allowing said first signal processor to measure a first bidirectional propagation delay time with said specific mobile station at an interval of predetermined time and compare the measured first bidirectional propagation delay time with a first threshold value;

g) allowing said first signal processor to repeatedly measure said first bidirectional propagation delay time if said first bidirectional propagation delay time is smaller than said first threshold value at said step f) and, if said first bidirectional propagation delay time is greater than or equal to said first threshold value at said step f), allowing said first signal processor to subtract said maximum bidirectional propagation delay value of said first speech sphere from said first bidirectional propagation delay time and set the subtracted result as a second bidirectional propagation delay time;

h) allowing said second signal processor to detect and demodulate said reverse traffic channel from said specific mobile station synchronously with said second bidirectional propagation delay time and assign a forward traffic channel ahead;

i) allowing said second signal processor to compare said second bidirectional propagation delay time with a second threshold value; and j) if said second bidirectional propagation delay time is greater than or equal to said second threshold value at said step i), selecting and utilizing said reverse traffic channel demodulated by said second signal processor and then transmitting said forward traffic channel assigned by said second signal processor to said specific mobile station.

11. The speech disable state solving method as set forth in claim 10, further comprising the steps of:

k) allowing said second signal processor to measure a third bidirectional propagation delay time with said specific mobile station, add said maximum bidirectional propagation delay value of said first speech sphere to the measured third bidirectional propagation delay time and set the added result as a fourth bidirectional propagation delay time;

l) allowing said second signal processor to compare said fourth bidirectional propagation delay time measured at said step k) with a third threshold value; and m) returning to said step k) if said fourth bidirectional propagation delay time is smaller than said third threshold value at said step l) and stopping the demodulation operation of said first signal processor if said fourth bidirectional propagation delay time is greater than or equal to said third threshold value at said step l).

12. The speech disable state solving method as set forth in claim 10, further comprising the step of k), if said second bidirectional propagation delay time is smaller than said second threshold value at said step i), selecting and utilizing said reverse traffic channel demodulated by said first signal processor, transmitting said forward traffic channel assigned by said first signal processor to said specific mobile station and then returning to said step f).

13. The speech disable state solving method as set forth in claim 10, wherein said first to third threshold values are defined as follows:

maximum bidirectional propagation delay value of first speech sphere<first threshold value<second threshold value<third threshold value<maximum bidirectional propagation delay value limited by modem ASIC.

14. In a method for operating a CDMA base station which partitions a speech radius wider than that limited in timing by a modem ASIC of said base station into first and second speech spheres by a predetermined unit below the maximum speech radius allowed by said base station modem ASIC to enlarge the limited speech radius, said base station having a first signal processor for processing forward link channels from said base station to mobile stations in said first and second speech spheres and reverse link channels from said mobile stations in said first speech sphere to said base station and a second signal processor for processing reverse link channels from said mobile stations in said second speech sphere to said base station, a method for solving a speech disable state based on the movement of a specific mobile station located in said second speech sphere to said first speech sphere, comprising the steps of:

a) allowing a clock generator to generate first and second EVEN SECOND clocks, said second EVEN SECOND clock being delayed from said first EVEN SECOND clock by the maximum bidirectional propagation delay value of said first speech sphere, and allowing said first and second signal processors to receive said first and second EVEN SECOND clocks from said clock generator, respectively;

b) allowing said first signal processor to assign pilot, synchronization and paging channels synchronously with said first EVEN SECOND clock and transmit them to all speech spheres covered by said base station;

c) if an access channel is sent from said specific mobile station located in said second speech sphere, allowing said second signal processor to detect and demodulate said access channel synchronously with said second EVEN SECOND clock;

d) allowing said second signal processor to assign a forward traffic channel ahead and transmit it to said specific mobile station in said second speech sphere;

e) if a reverse traffic channel is sent from said specific mobile station in said second speech sphere, allowing said second signal processor to detect and demodulate said reverse traffic channel synchronously with said second EVEN SECOND clock;

f) allowing said second signal processor to measure a first bidirectional propagation delay time with said specific mobile station at an interval of predetermined time, add said maximum bidirectional propagation delay value of said first speech sphere to the measured first bidirectional propagation delay time and set the added result as a second bidirectional propagation delay time;

g) allowing said second signal processor to compare said second bidirectional propagation delay time with a first threshold value;

h) returning to said f) if said second bidirectional propagation delay time is greater than said first threshold value at said step g) and, if said second bidirectional propagation delay time is smaller than or equal to said first threshold value at said step g), allowing said first signal processor to detect and demodulate said reverse traffic channel from said specific mobile station synchronously with said second bidirectional propagation delay time and to assign a forward traffic channel;

i) allowing said second signal processor to compare said second bidirectional propagation delay time with a second threshold value; and j) if said second bidirectional propagation delay time is smaller than or equal to said second threshold value at said step i), selecting and utilizing said reverse traffic channel demodulated by said first signal processor and transmitting said forward traffic channel assigned by said first signal processor to said specific mobile station.

15. The speech disable state solving method as set forth in claim 14, further comprising the steps of:

k) allowing said first signal processor to measure a third bidirectional propagation delay time with said specific mobile station and compare the measured third bidirectional propagation delay time with a third threshold value; and l) allowing said first signal processor to repeatedly measure said third bidirectional propagation delay time if said third bidirectional propagation delay time is greater than said third threshold value at said step k) and stopping the demodulation operation of said second signal processor if said third bidirectional propagation delay time is smaller than or equal to said third threshold value at said step k).

16. The speech disable state solving method as set forth in claim 14, further comprising the step of k), if said second bidirectional propagation delay time is greater than said second threshold value at said step i), selecting and utilizing said reverse traffic channel demodulated by said second signal processor, transmitting said forward traffic channel assigned by said second signal processor to said specific mobile station and then returning to said step f).

17. The speech disable state solving method as set forth in claim 14, wherein said first to third threshold values are defined as follows:

first threshold value>second threshold value>third threshold value>maximum bidirectional propagation delay value of first speech sphere.

18. In a method for operating a CDMA base station which partitions a speech radius wider than that limited in timing by a modem ASIC of said base station into first and second speech spheres by a predetermined unit below the maximum speech radius allowed by said base station modem ASIC to enlarge the limited speech radius, said base station having a first signal processor for processing forward link channels from said base station to mobile stations in said first and second speech spheres and reverse link channels from said mobile stations in said first speech sphere to said base station and a second signal processor for processing reverse link channels from said mobile stations in said second speech sphere to said base station, a method for solving a speech disable state based on the location of a specific mobile station in a border area between said first and second speech spheres, comprising the steps of:

a) allowing a clock generator to generate first and second EVEN SECOND clocks, said second EVEN SECOND clock being delayed from said first EVEN SECOND clock by the maximum bidirectional propagation delay value of said first speech sphere, and allowing said first and second signal processors to receive said first and second EVEN SECOND clocks from said clock generator, respectively;

b) allowing said first signal processor to assign pilot, synchronization and paging channels synchronously with said first EVEN SECOND clock and transmit them to all speech spheres covered by said base station;

c) allowing said first signal processor to set up the size of an access channel preamble scanning window to be greater than said maximum bidirectional propagation delay value of said first speech sphere;

d) if an access channel is sent from said specific mobile station in said border area, allowing both of said first and second signal processors to detect and demodulate said access channel synchronously, respectively, with said first and second EVEN SECOND clocks and measure first and second bidirectional propagation delay times with said specific mobile station, respectively;

e) allowing both of said first and second signal processors to assign forward traffic channels and transmit them to said specific mobile station;

f) if a reverse traffic channel is sent from said specific mobile station, allowing both of said first and second signal processors to detect and demodulate said reverse traffic channel synchronously, respectively, with said first and second EVEN SECOND clocks;

g) comparing said first and second bidirectional propagation delay times measured at said step d) with each other to determine which one of said first and second speech spheres is a near-by speech sphere; and h) if said first speech sphere is determined to be the near-by speech sphere at said step g), selecting and utilizing said reverse traffic channel demodulated by said first signal processor and transmitting said forward traffic channel assigned by said first signal processor to said specific mobile station and, if said second speech sphere is determined to be the near-by speech sphere at said step g), selecting and utilizing said reverse traffic channel demodulated by said second signal processor and transmitting said forward traffic channel assigned by said second signal processor to said specific mobile station.

* * * * *